United States Patent [19]
Salz et al.

[11] Patent Number: 5,484,185
[45] Date of Patent: Jan. 16, 1996

[54] VEHICLE ROOF WITH A SERIES OF PLATES

[75] Inventors: Wolfram Salz, Stockdorf; Burkhard Reinsch, Neuried, both of Germany

[73] Assignee: Webasto Karosseriesysteme GmbH, Stockdorf, Germany

[21] Appl. No.: 398,079

[22] Filed: Mar. 3, 1995

[30] Foreign Application Priority Data

Mar. 4, 1994 [DE] Germany .................. 44 07 286.4

[51] Int. Cl.⁶ ........................................ B60J 7/047
[52] U.S. Cl. ...................... 296/220; 296/217; 296/223
[58] Field of Search ................................ 296/216, 217, 296/220, 223

[56] References Cited

U.S. PATENT DOCUMENTS 4,474,405  10/1984  Kloppe ......................... 296/216 X
5,335,961  9/1994   Reinsch et al. ................ 296/213
5,362,122  11/1994  Reihl et al. ................... 296/216

Primary Examiner—Dennis H. Pedder
Attorney, Agent, or Firm—Sixbey, Friedman, Leedom & Ferguson

[57] ABSTRACT

Vehicle roof with plates to close or open a roof opening, in which the plates, in the closed position, form a panel of plates, and they are guided at each lateral side of the roof on two guides along guide devices fixed to the roof, so that the panel of plates, by pivoting individual plates, is released plate by plate when the roof is being opened or is restored when closing the roof. Slidable bearing units are provided along a common guide track in which, in each case, the rear guide of one of the plates and the forward guide of the next plate are supported and which thus, by the plates themselves or by plate carders, are interlocked with one another. The beating units are provided with a blocking device that is controlled depending on movement of the panel of plates and that releases the rear guide of the associated plate for a pivoting movement when the roof is being opened, or when the roof is being closed, interlocks with the bearing unit when the beating unit reaches a predetermined position with respect to the fixed guide device.

16 Claims, 21 Drawing Sheets

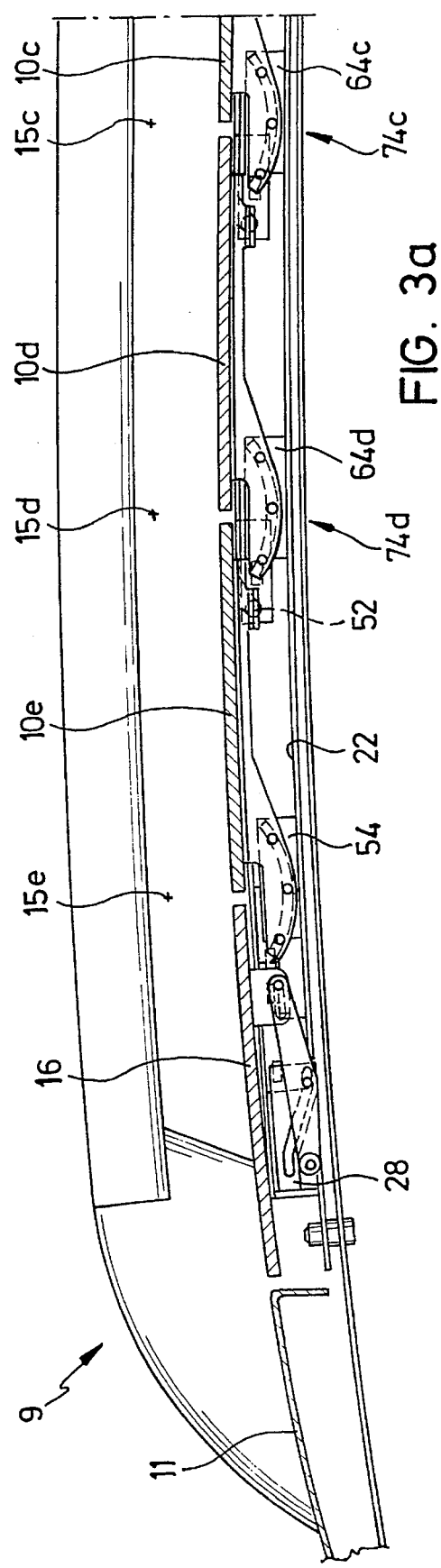
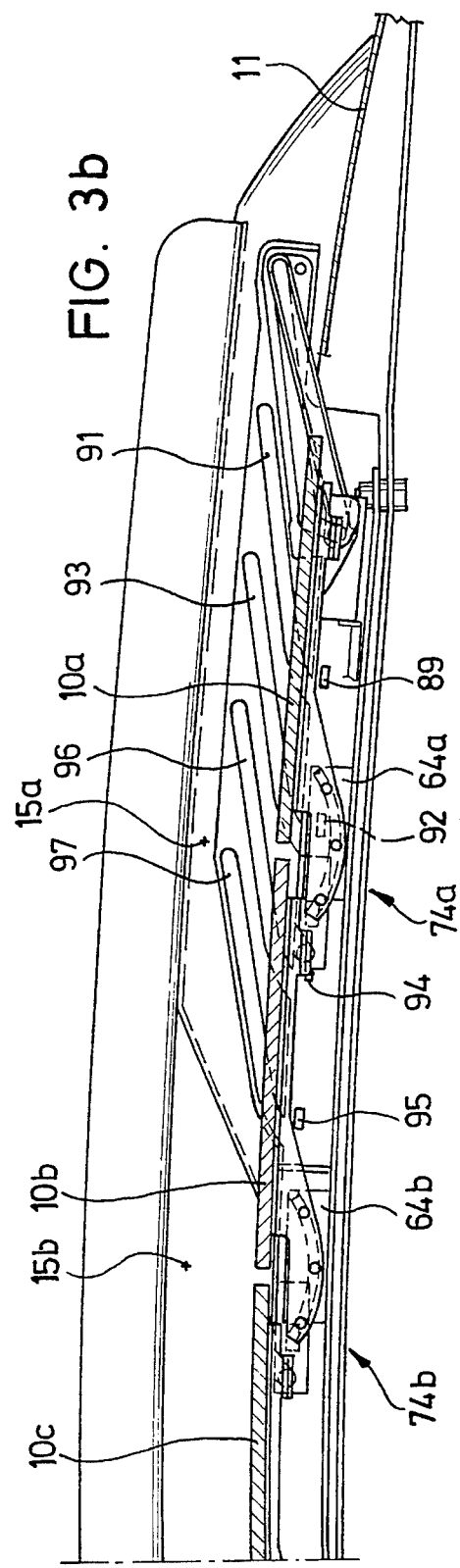

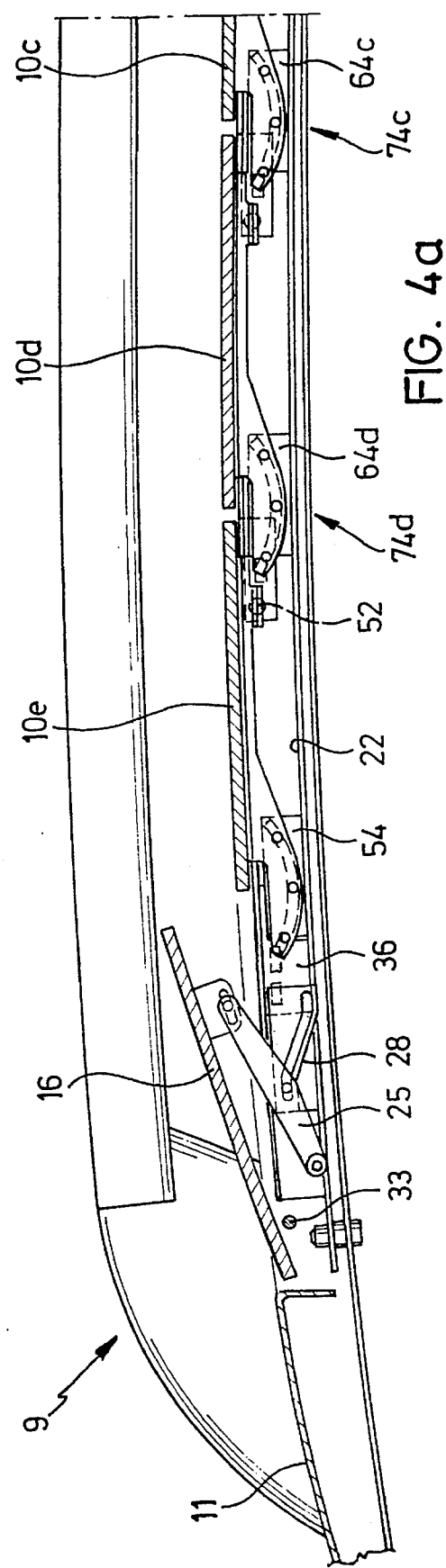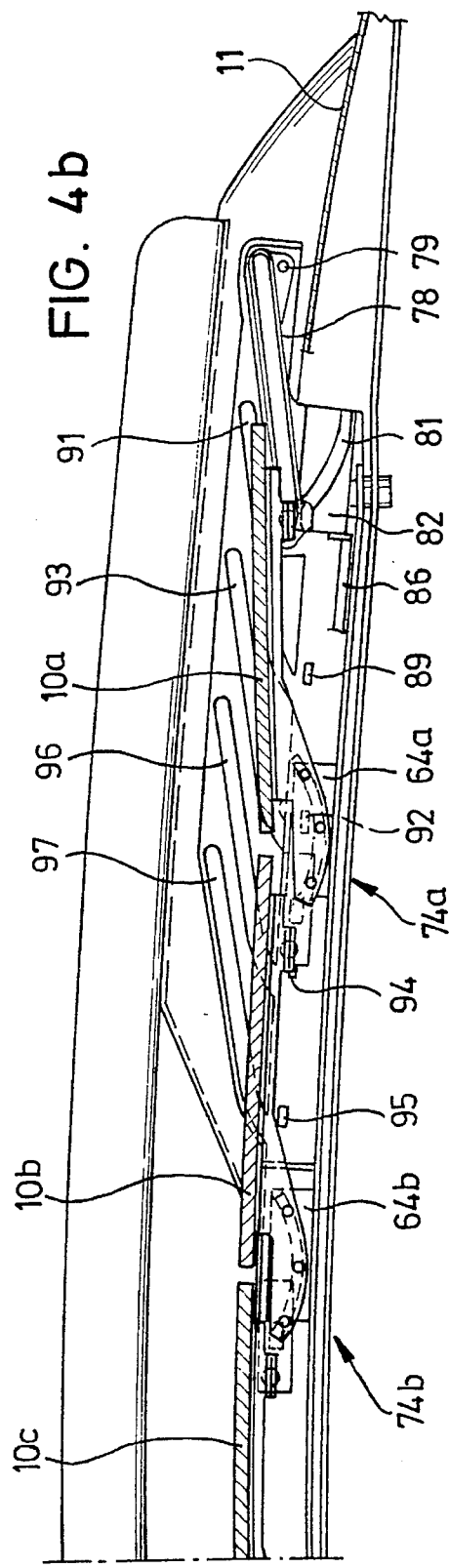

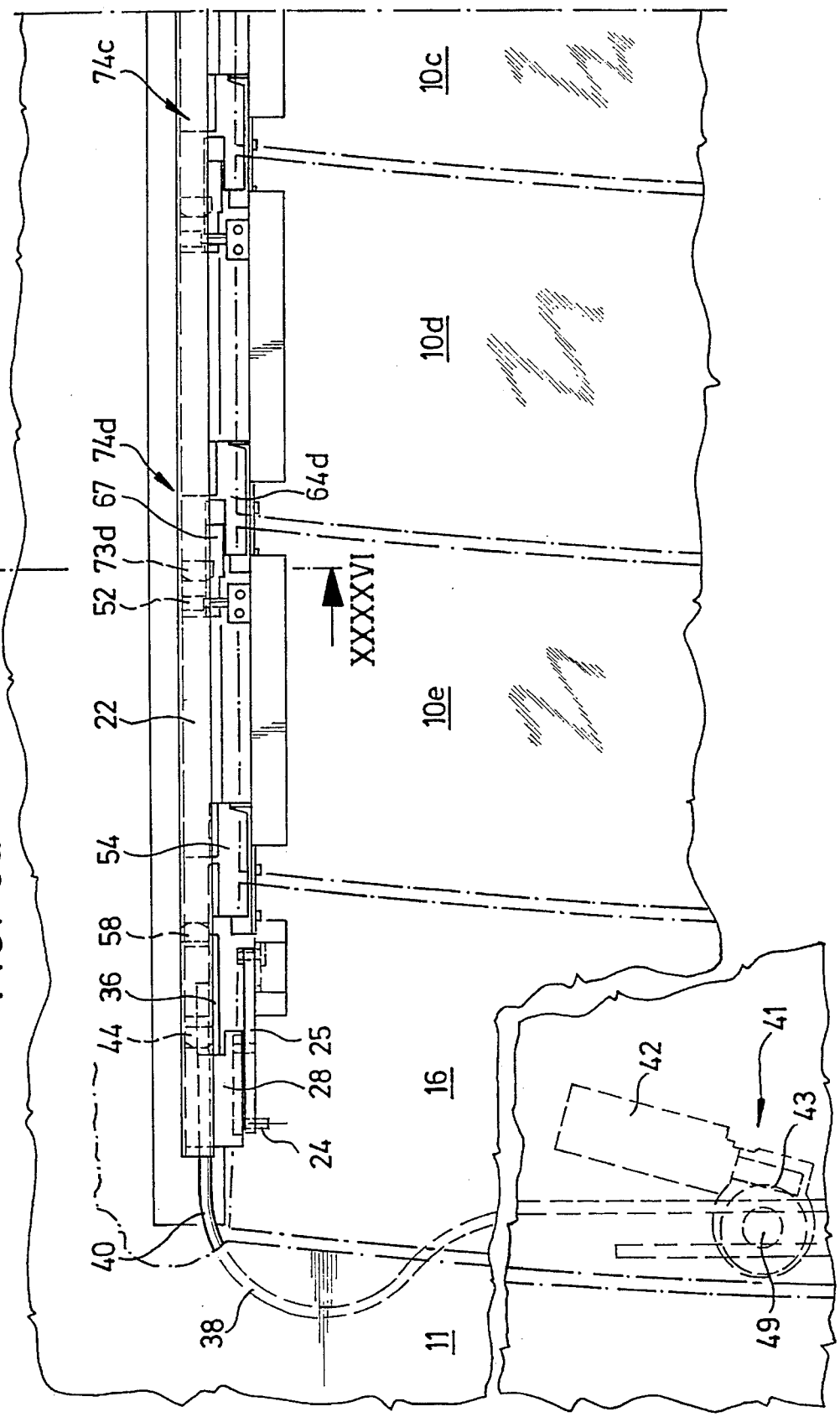

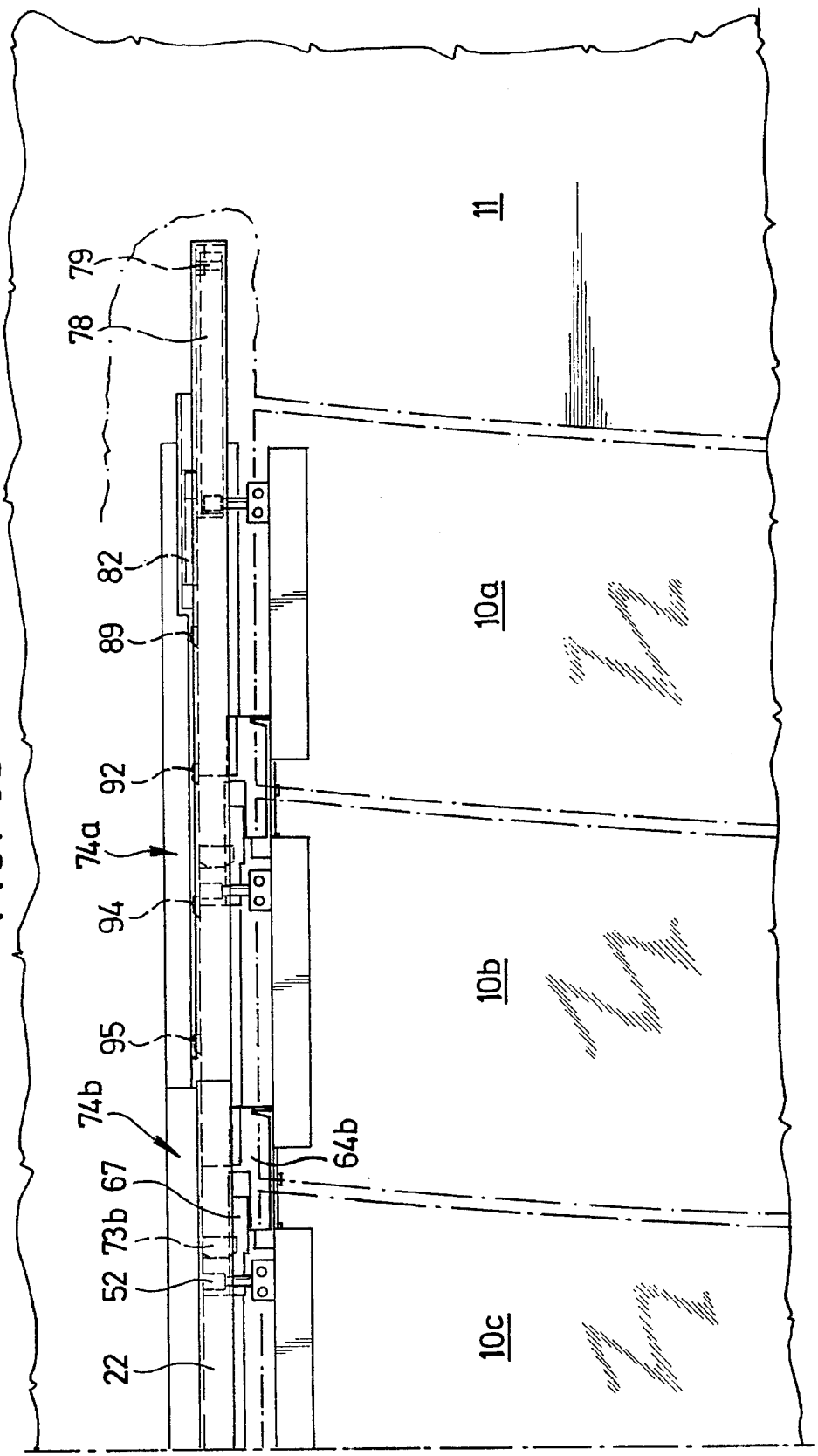

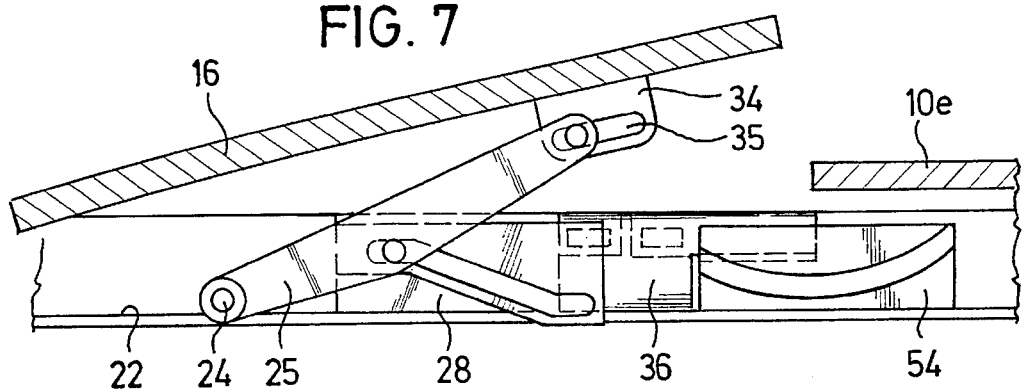
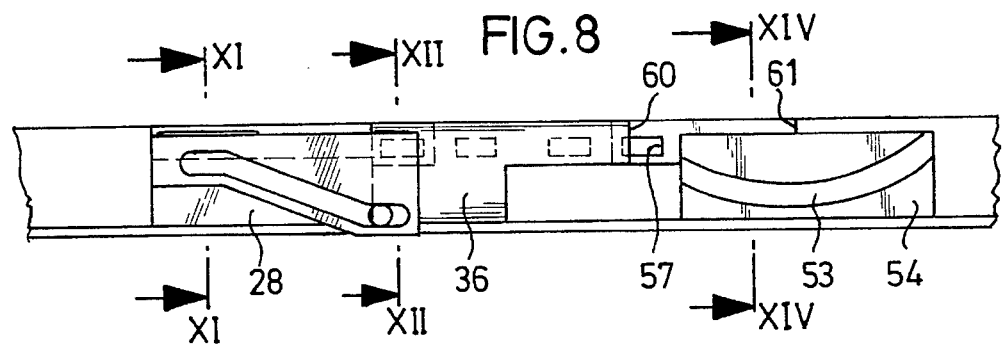
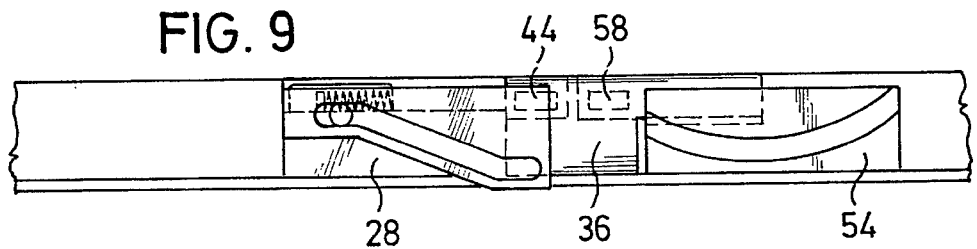
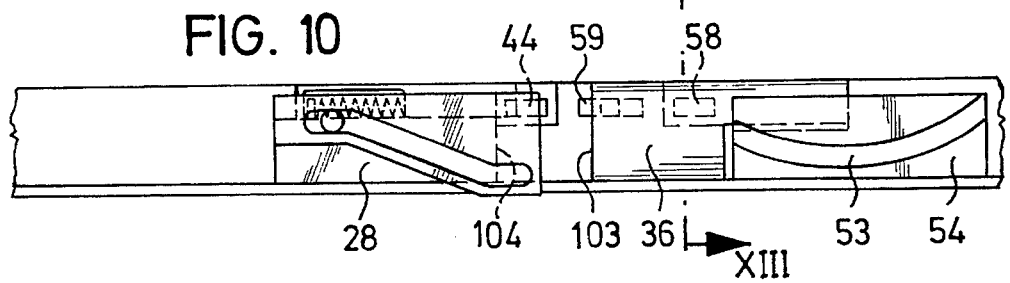

FIG. 31
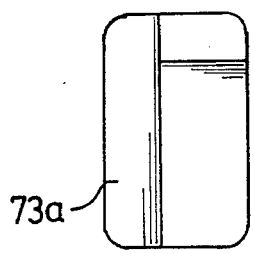
FIG. 34
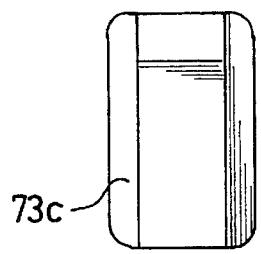
FIG. 36
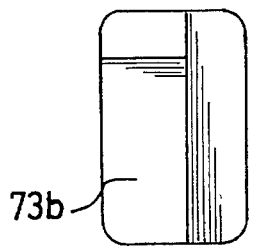
FIG. 32
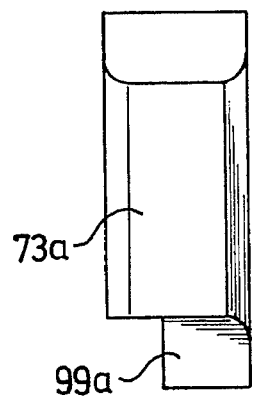
FIG. 35
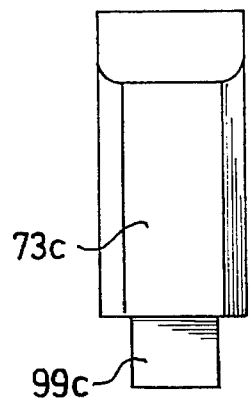
FIG. 37
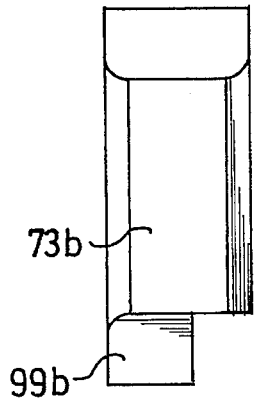
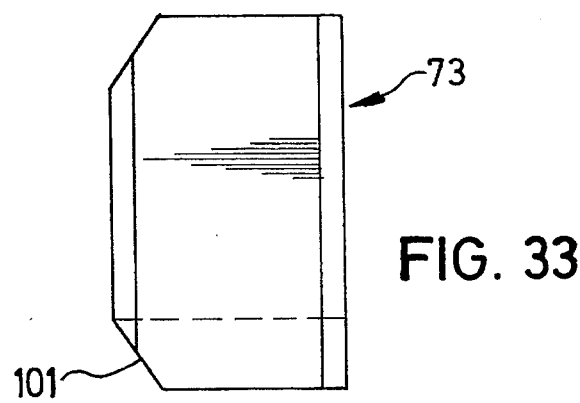
FIG. 33

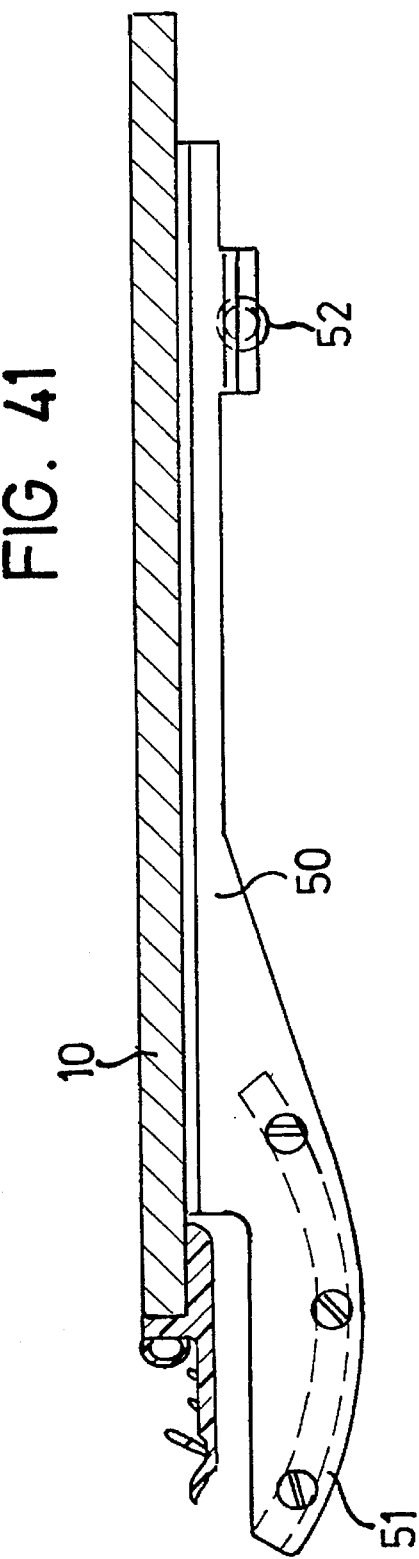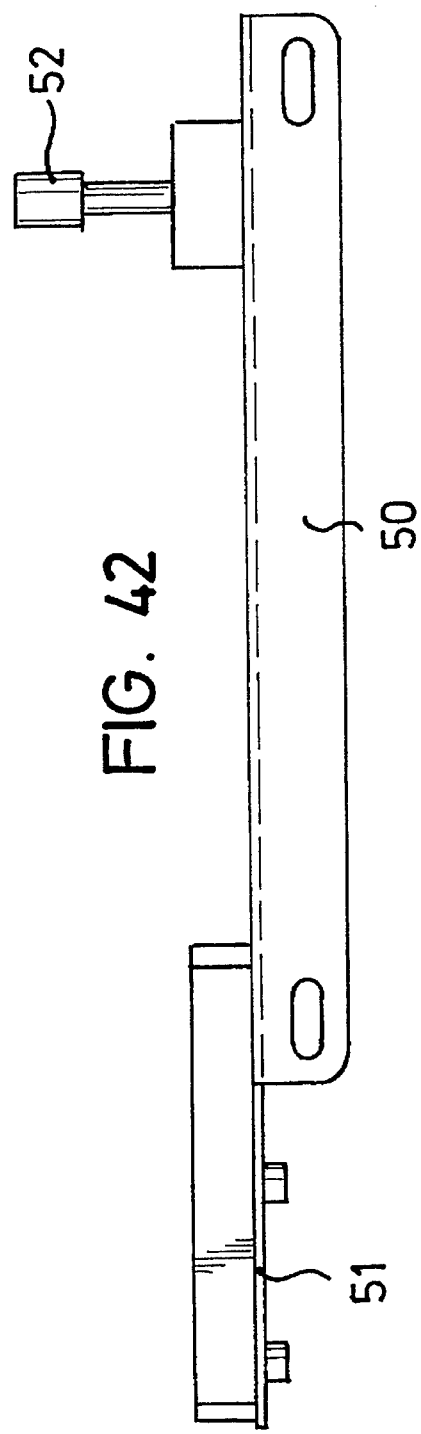

VEHICLE ROOF WITH A SERIES OF PLATES

BACKGROUND OF THE INVENTION

1. Field of the Invention

The invention relates to a vehicle roof with a series of plates by which a roof opening in a roof panel can be selectively closed or at least partially opened, the plates, in the closed position, bordering one another to form a continuous panel of plates, in which each plate is slidably guided along a path of movement in a guide device that is connected with the fixed roof surface, on each lateral side of the roof opening, on a pair of guide elements which are spaced one forward of the other in a sliding direction, so that, when the plates are displaced along the guide device in an opening direction, the plates of the continuous panel of plates perform a translational movement during which the panel of plates is separated into individual plates in a plate-by-plate manner commencing with a rearmost plate of the plate system, the panel of plates being reestablished in a plate-by-plate manner commencing with a forwardmost plate when the plates are displaced along the guide device in a closing direction. In particular to such a roof wherein the guide device has separate, first and second guideways, the forward one of said guide elements of all of the plates interacting with the first guideway of the guide device and the rear one of said guide elements of all of the plates interacting with the second guideway of the guide device.

2. Description of Related Art

In a known vehicle roof of this type (U.S. Pat. No. 5,335,961), each plate is pivoted, at one of their guide points, on a sliding element that is displaceable along longitudinal guide devices, around a beating pin. At the other guide point, each plate interacts with a guide track, which forces the pivoting movement necessary for plate-by-plate release and restoration of the panel of plates, depending on the sliding movement of the plates. To displace the plates, a single drive device is provided for all of the plates. The sliding element of each plate can be coupled to, or uncoupled from, the drive device by a locking block coupling.

In U.S. Pat. No. 5,362,122 another vehicle roof of the initially-mentioned type is disclosed. In this case, a longitudinal guideway is provided running at least approximately parallel to a respective part of the stationary roof panel bordering each lateral side of the roof opening, and each plate is guided, in the area of its front end, by the front guide elements in this longitudinal guideway below the lateral side of the roof opening. Additionally, a roof rail (resembling the side rail of a roof luggage rack) is provided extending above the stationary roof panel at each lateral side of the roof opening, each roof rail having a guide channel for guiding the plates by the rear guide elements in the area of their rear ends, when the plates are displaced rearwardly.

SUMMARY OF THE INVENTION

A primary object of the invention is further to develop such known vehicle roofs so that the displacement mechanism is simplified as a whole, is especially robust, and makes do with a relatively low structural height, yet provides for an especially stable support of the plates in the closed and in the open state.

In a vehicle roof of the initially-mentioned type this object is achieved according to the invention by providing, along a common guide track, slidable bearing units in which, to displace the plate system, in each case the rear guide point of one of the plates and the forward guide point of the subsequent plates in the interconnected plate system are supported, slidable bearing units which thus are interlocked with one another by the plates themselves or by the carrying devices supporting the plates, and by providing these bearing units with a blocking device controlled depending on the adjustment movement of the panel of plates, a blocking device that releases the rear guide point of the associated plate, when the roof is opened, for a pivoting movement or, when closing the roof, again interlocks with the associated bearing unit when the bearing unit, in the course of its sliding movement, reaches a predetermined position with respect to the guide device integral with the roof. In the vehicle roof according to the invention, the drive forces are transmitted directly from plate to plate by form closure, which provides for great robustness. The type of plate guidance according to the invention makes it possible to have an especially stable support of the plates in all operating positions.

In another configuration of the invention, the bearing units in each case are provided with a pivot bearing in which a plate, with its forward guide point, is pivoted and that has a receiving point detachably to receive the rear guide point of the forwardmost plate in the interconnected plate system, and with a blocking element that is adjustable relative to the pivot bearing to lock the appropriate rear guide point in the receiving point or to release it for a pivoting movement of the plate. To preclude, with certainty, undesired adjustment movements, preferably the beating units are equipped with a locking device that locks the pivot beating and the blocking element in a mutually blocked position when the roof is closed and when the panel of plates is slid, a blocked position in which the rear guide point is held in place. To securely fix the pivoted plates, in another configuration of the invention it can be provided that the bearing units in each case are provided with a locking device that locks the pivot bearing with respect to a part integral with the roof when the bearing unit has reached a position in which the plate whose forward guide point is supported in the bearing unit is completely pivoted.

Both above-mentioned locking devices can be made from a common changeover coupling matte as a locking block coupling which, depending on the position of the associated beating unit with respect to the guide device integral with the roof, fixes the pivot beating either with respect to the blocking element or to the pan integral with the roof. This makes it possible to achieve an especially high operational reliability with comparatively few structural parts. Suitably a pivot track is allocated in each case to the plates to guide the rear guide point released for the pivoting movement, and the pivot track for the rearmost plate is part of a hinged pivot guide device, by which the rear edge of the rearmost plate can be lifted, when the roof is opened and before sliding the panel of plates, above the rear edge of the roof opening, while the pivot tracks of the remaining plates are made integral with the roof.

The forward guide point of the forwardmost plate is advantageously supported in a pivot bearing that is adjustable along the guide device integral with the roof and that is connected to a drive unit in a permanent or detachable connection. A permanent connection to the drive device is suitable for the case in which the hinged pivot guide device of the last plate is adjusted by a separate drive device. If, on the other hand, only a single drive device is present, advantageously the pivot bearing allocated to the forwardmost plate can be coupled with a coupling element that is adjustable along the guide device integral with roof and that, for its part, is permanently connected to the drive unit and can suitably be coupled, depending on its position with respect to the guide device integral with the roof, automatically with the pivot bearing of the forwardmost plate or with an adjustment device for the hinged pivot guide device and/or with an adjustment device for a draft deflector.

These and further objects, features and advantages of the present invention will become apparent from the following description when taken in connection with the accompanying drawings which, for purposes of illustration only, show a single embodiment in accordance with the present invention.

BRIEF DESCRIPTION OF THE DRAWINGS

FIGS. 3a and 3b, placed next to one another, represent a lengthwise section through the roof in the closed state;

FIGS. 4a and 4b, placed next to one another, represent a lengthwise section through the roof with a raised wind deflector and raised rearmost plate;

FIGS. 6a and 6b, placed next to one another, provide a top view one side and the center front of the vehicle roof in the closed state;

FIGS. 7 to 10 are enlarged side views of the wind deflector sliding block, of the coupling element and of the forwardmost pivot bearing in various working positions, with FIG. 7, additionally, showing the wind deflector and the forwardmost sliding plate;

FIGS. 31 to 37 are views of the locking blocks of the bearing units;

FIG. 41 is a side view of a plate with an associated plate carrier;

FIG. 42 is a top view of the plate carder of FIG. 41 with the associated plate removed;

FIG. 46 is a sectional view taken along line XXXXVI—XXXXVI of FIG. 6a.

DETAILED DESCRIPTION OF THE PREFERRED EMBODIMENT

Figure 1:
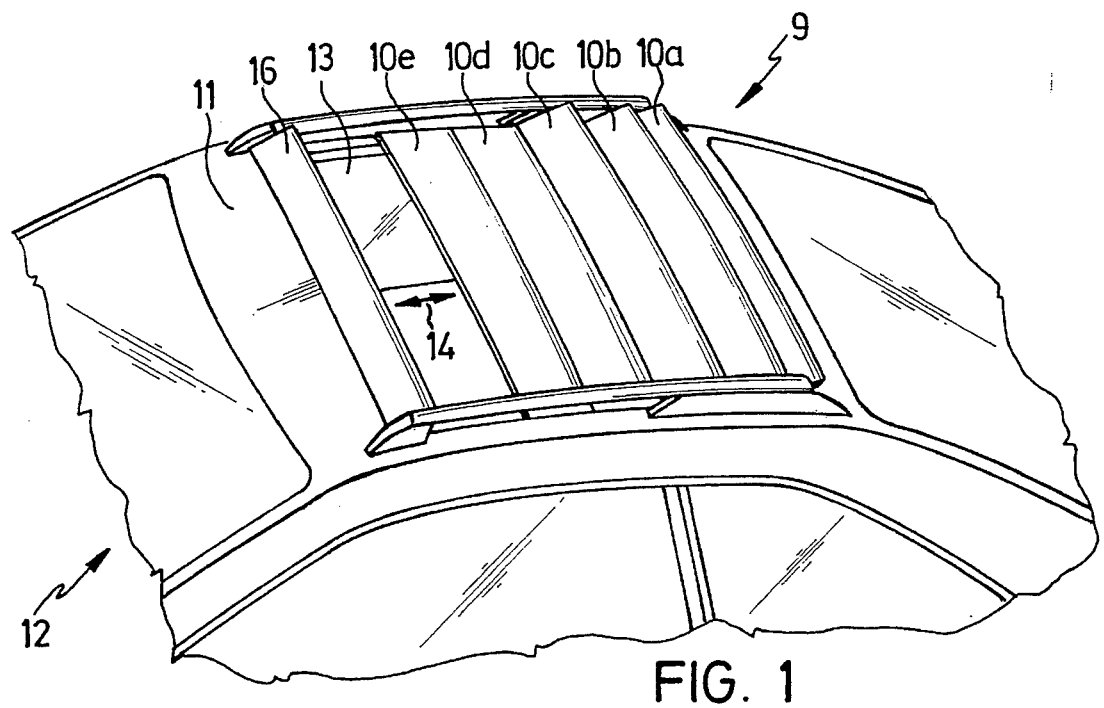
FIG. 1 is a perspective, diagrammatic view of a plate roof in a partially opened state.
Figure 2:
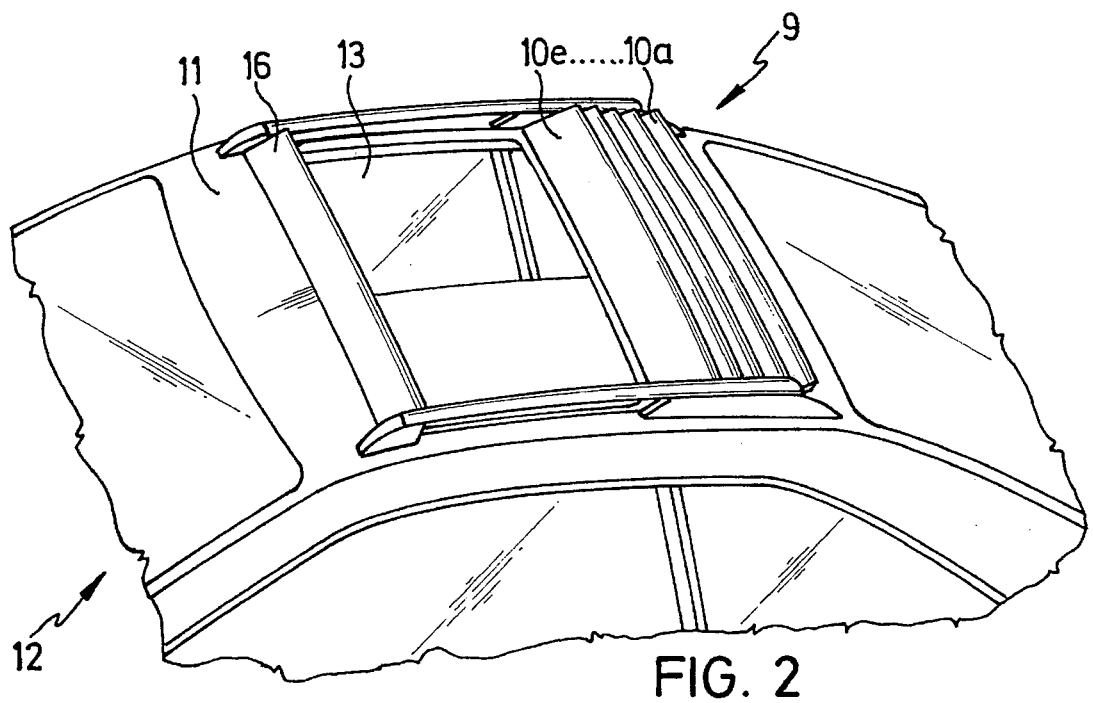
FIG. 2 is a view corresponding to that of FIG. 1 with the roof fully opened.

The vehicle roof 9, designated a "plate roof" herein, as apparent from FIGS. 1 and 2, is formed of a series of sliding plates 10a to 10e. The plates 10a to 10e are displaceable to selectively close, and at least partially open, a roof opening 13 formed in a fixed roof panel 11 of a motor vehicle 12. To open and close roof 9, plates 10a to 10e can be slid, in the directions of double arrow 14, parallel to the longitudinal axis of the vehicle; although, other sliding directions are possible, e.g., crosswise to the longitudinal axis of the vehicle.

In their closed position, as is shown in FIG. 1 for plates 10d and 10e, plates 10a to 10e abut one another tightly. Thus, they form a panel of plates. Each of plates 10a to 10e are also able to be pivoted in and around a respective pivot axis extending crosswise to sliding direction 14. [These pivot axes are indicated in FIGS. 3a and 3b at 15a to 15e.] A displacement mechanism described in more detail below coordinates the sliding and pivoting movements of the individual plates 10a to 10e so that, when displacing the sliding plates, they perform a translatory movement in sliding direction 14, and when roof 9 is opened, each plate of the interconnected series of plates is sequentially released from the panel of plates, beginning with the rearwardmost plate (which is the first plate in the opening direction), by moving the plates outward on a plate-by-plate basis, the panel being restored on a plate-by-plate basis in reverse (i.e., beginning with the forwardmost plates) when the roof is closed.

Figure 5A:
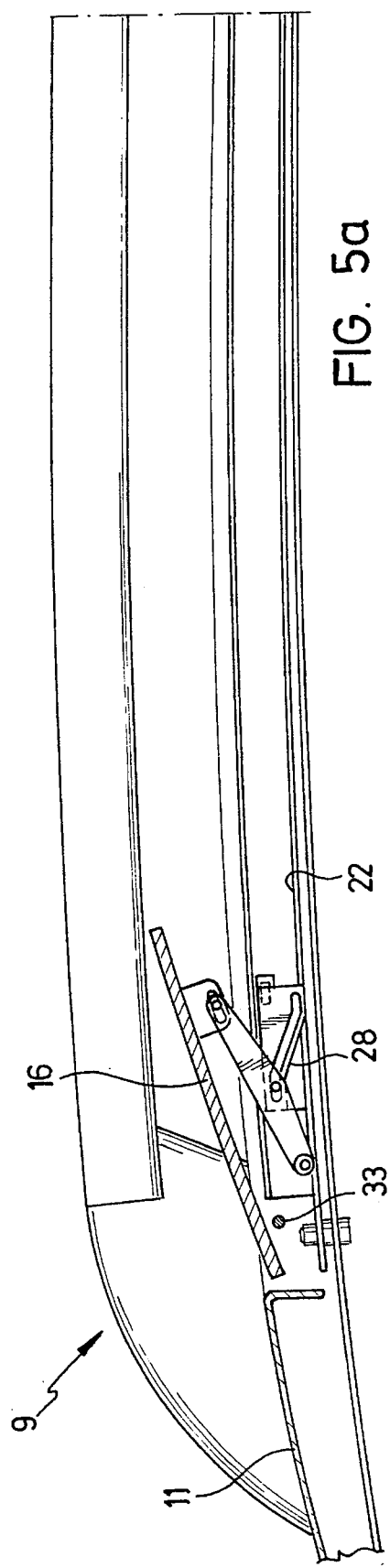
FIGS. 5a and 5b, placed next to one another, represent a section through the roof in fully opened state.
Figure 5B:
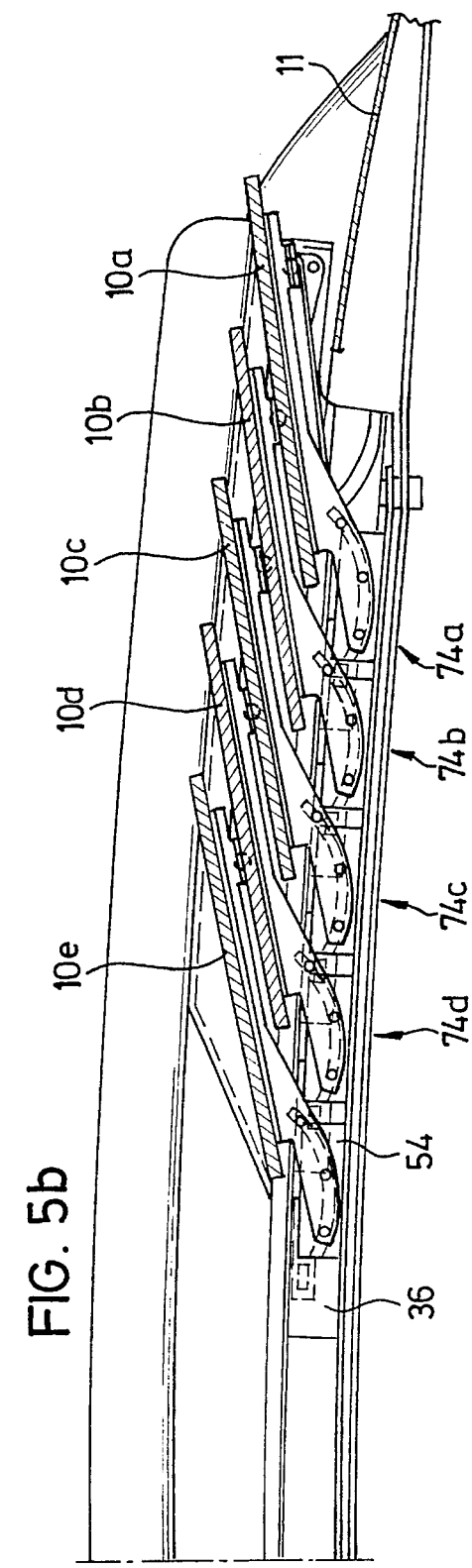
Figure 11:
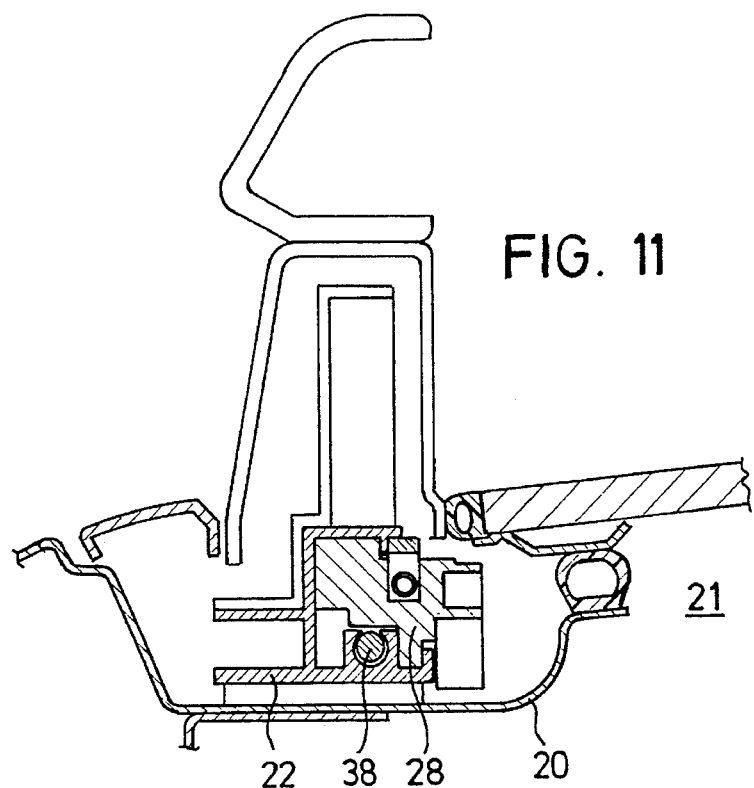
FIGS. 11 & 12 are sectional views taken along lines XI—XI & XII—XII in FIG. 8.
Figure 12:
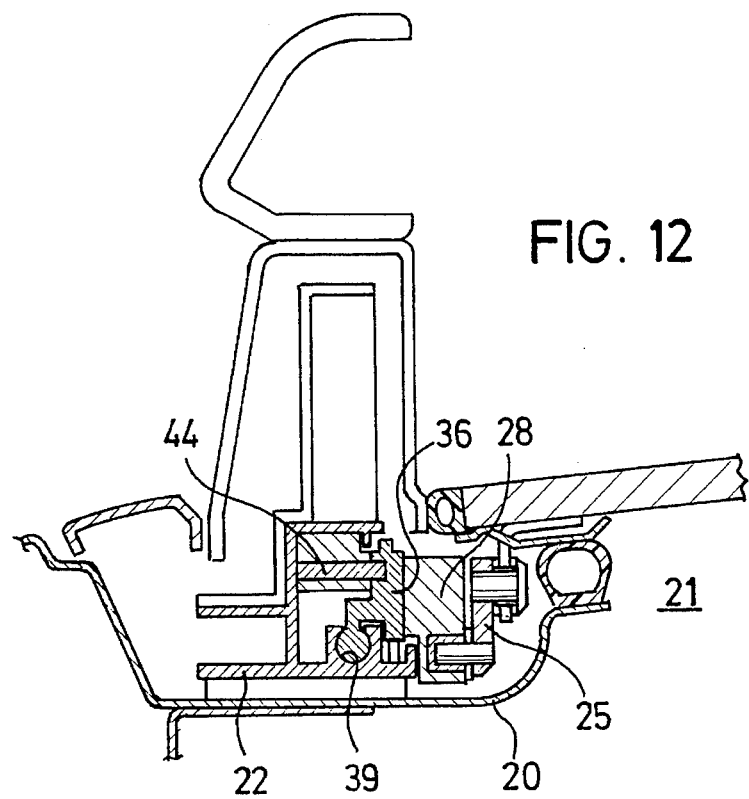
Figure 13:
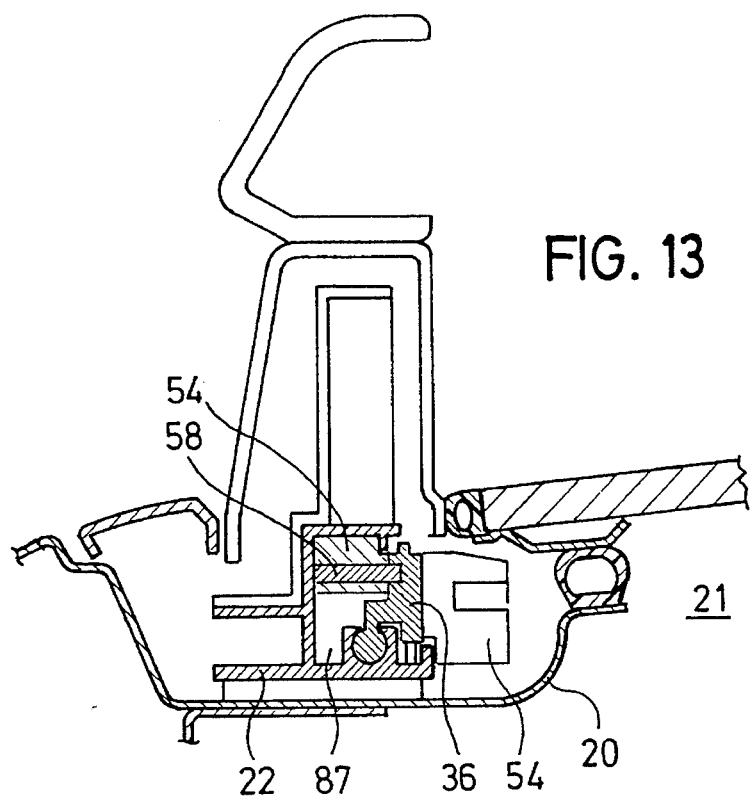
FIG. 13 is a sectional view taken along line XIII—XIII in FIG. 10.
Figure 14:
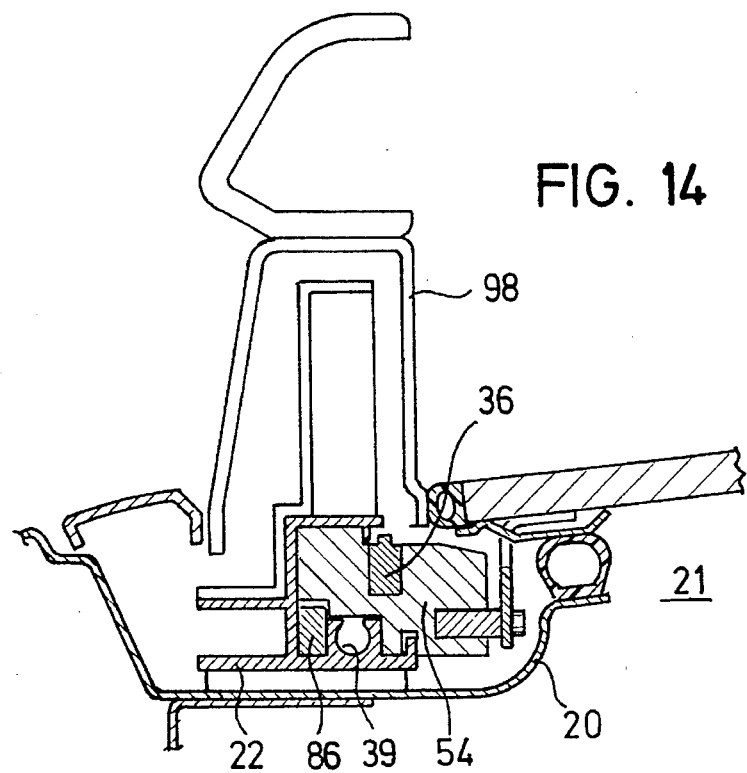
FIG. 14 is a sectional view taken along line XIV—XIV in FIG. 8.

In the course of opening roof 9 from its fully closed position (FIGS. 3a, 3b), first only plate 10a is released from the panel of plates by pivoting this plate, as shown in FIG. 4b, so that its rear edge is released from the rear edge of roof opening 13. Plate 10a can then, starting from this inclined position, be pushed rearward together with the rest of plates 10b to 10e, which remain interconnected in the panel of plates, i.e., they are not pivoted. During this rearward movement, plate 10a continues to pivot further upward as it moves to its rear end position. Once plate 10a has reached its rear end position, illustrated in FIGS. 1, 2, and 5b, the next plate 10b is pivoted. This process is repeated until, as shown in FIG. 2, all of the sliding plates 10a to 10e have been pivoted and pushed marward into their fully open position.

When closing the roof, starting from the fully open position of FIG. 2, first only the forwardmost plate 10e is moved back toward the front and pivoted back into a position parallel to fixed roof panel 11. A corresponding course of movement is then forced sequentially on each one of the following plates 10d to 10a, one after the other, until all of the plates are in their forward end position m-forming the panel of interconnected plates and closing roof opening 13.

In the case of the illustrated embodiment, in the area of the forward end of roof opening 13, there is a pivotable plate-shaped wind deflector 16 which, when the opening procedure begins, is pivoted around a virtual pivot axis 33 (FIGS. 4a & 5a) running crosswise to the lengthwise axis of the vehicle into a position rising toward the rear. In this condition, the roof assumes a ventilation position that can be used when the plates are in their closed position, even in rain. Wind deflector 16 lies tightly, in its closed position (FIG. 6a), against adjacent plate 10e. In doing so, deflector 16 closes the forwardmost part of roof opening 13.

However, optionally, the roof can be constructed so that the interconnected panel of plates 10a to 10e extends from the forward edge to the rear edge of roof opening 13 in the closed position, and thus, the plates alone assume the full closing function. In such a case, optionally, in a way known in the art for sliding roofs (e.g., U.S. Pat. No. 5,052,746 and published German Patent Application Nos. 23 25 594 and 34 26 998), a wind deflector can be provided which, when the roof is closed, disappears under the solid roof panel and automatically goes into a working position when the roof is opened.

FIGS. 1 and 2 show a vehicle roof with five sliding plates 10a to 10e. But of course, basically, any number of sliding plates can be selected, depending on the respective circumstances.

Vehicle roof 9 has a roof frame 20 located under fixed roof panel 11 that defines a frame opening 21 (FIGS. 11–14). Each side of frame 20 carries a respective guide rail 22 running in the sliding direction 14. The design is essentially in mirror-image symmetry on both sides of the longitudinal centerline of roof 9, so that the representations and explanations for the one side of the roof apply also to the other side of the roof.

Figure 15:
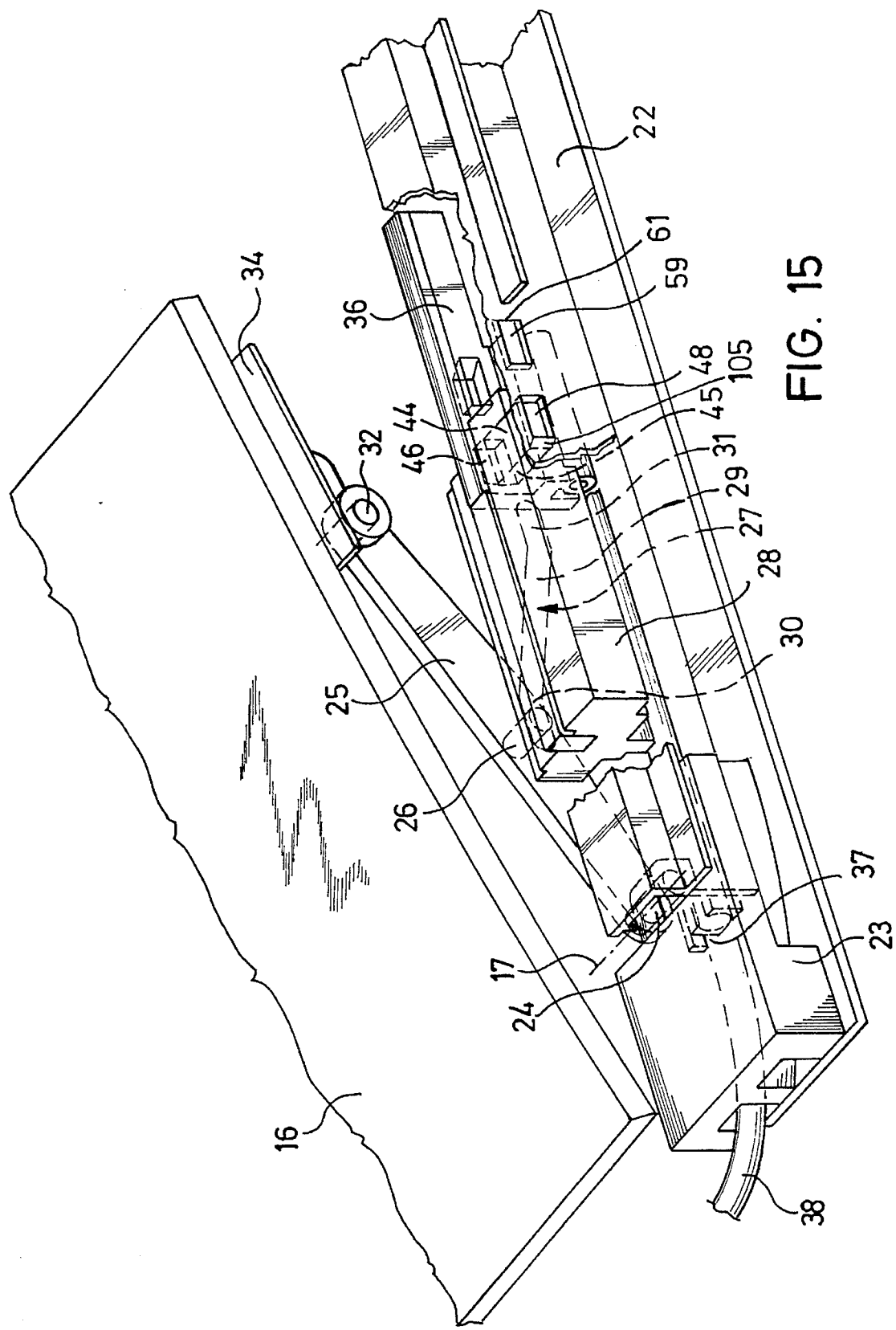
FIG. 15 is a perspective partial view of the vehicle roof in the area one side of the wind deflector.
Figure 16:
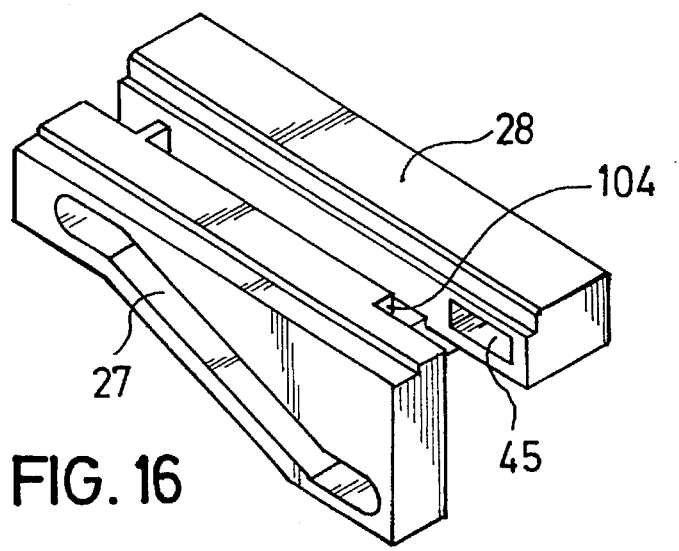
FIG. 16 is a perspective view of a wind deflector sliding block.
Figure 17:
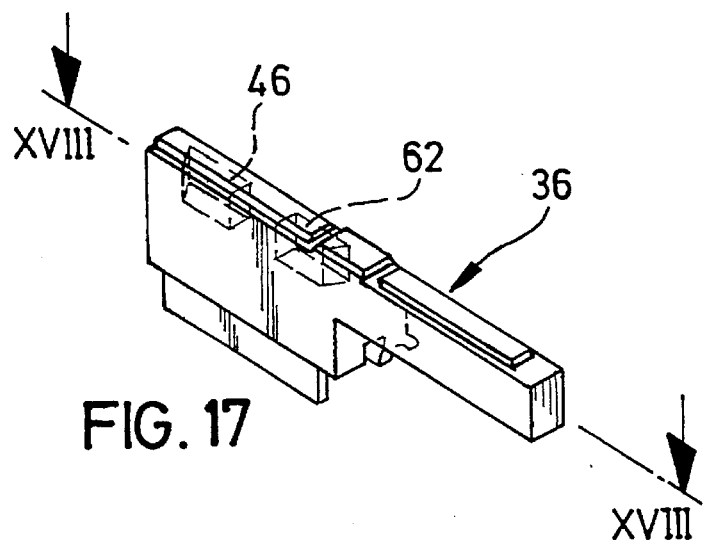
FIG. 17 is a perspective view of a coupling element.

On the forward end of each guide rail 22, on both sides of the roof, a bearing block 23 is provided which is integral with the roof and which receives a bearing pin 24 (FIG. 15). A forward end of a pivoting lever 25 is hinged by a bearing pin 24 to each bearing block 23. The bearing blocks 23 define a pivoting axis 17 of pivoting lever 25. A sliding block pin 26 projects outward from pivoting lever 25 at a position that is offset toward the rear relative to the bearing pin 24. The sliding block pin 26 engages in a sliding block track 27 (see especially FIGS. 15 and 16) that is formed in the side of a wind deflector sliding block 28 that faces the roof opening 13 and frame opening 21. The track 27 has a main section 29 that is sloped forward and upward, and forward and rear end sections 30, 31 running parallel to the sliding direction 14.

The rear end of pivoting lever 25 is linked by a pivot pin 32 to a beating 34 near the rear end of wind deflector 16. Here, pivot pin 32 is displaceably guided in a slot 35 (FIG. 7) of beating 34, slot 35 extending parallel to the wind deflector 16. This arrangement forms a (virtual) pivot axis 33 (FIG. 4a), which can lie at the height of fixed roof panel 11 or above it, to avoid, when pivoting wind deflector 16, an undesired dipping of the front edge of the wind deflector into roof opening 13.

Figure 40:
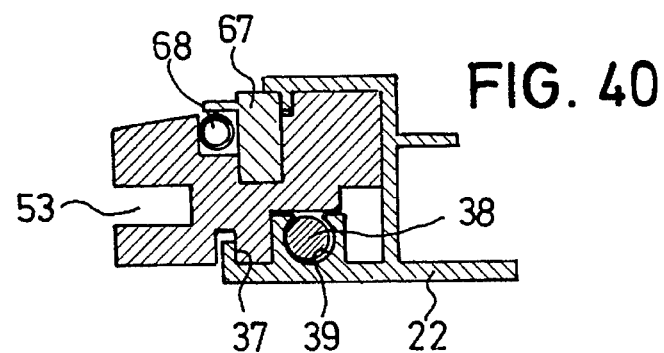
FIG. 40 is a sectional view taken along line XXXX—XXXX of FIG. 39.

The wind deflector sliding block 28, used for pivoting wind deflector 16, is guided to slide lengthwise a limited distance along guide rail 22. To displace wind deflector sliding block 28, this sliding block is slaved to a coupling element 36 by a coupling, for example, according to the illustrated embodiment, a locking block coupling. For its part, coupling element 36 is guided to slide along a guide track 37 of guide rail 22, and it is permanently connected to a rigid drive cable 38. Drive cable 38, preferably made as a threaded cable, extends through a cable guide channel 39 of guide rail 22 (FIG. 40) and through a tubular guide 40, connected to the guide rail 22 in the forward area of roof frame 20, to a drive unit 41 (FIG. 6a).

In the illustrated embodiment, the drive unit 41 has an electric motor 42 and a reduction gear 43. A pinion gear 49, connected to the output of reduction gear 43, is meshed with drive cable 38 and with a corresponding drive cable for the other side of the roof.

To selectively produce a driving connection between drive unit 41 and wind deflector 16, the locking block coupling has a locking block 44 that is slidably supported in an opening 45 extending through the wind deflector sliding block 28 crosswise to guide rail 22, and that engages in a locking block receiving area 46 of coupling element 36, when the coupling element 36 assumes its forward end position. In this position, sliding block pin 26 is located in rear end section 31 of sliding block track 27, by which wind deflector 16 is secured against unintended lifting.

Figure 18:
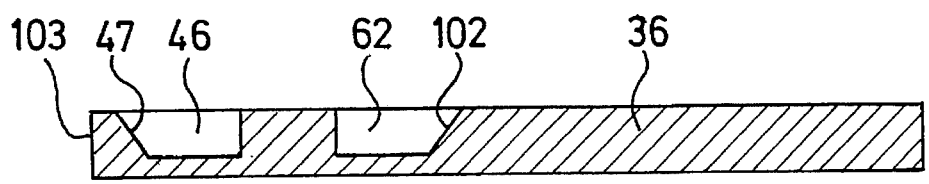
FIG. 18 is a sectional view taken along line XVIII—XVIII of FIG. 17.

If coupling element 36 is shifted rearward by drive cable 38, wind deflector sliding block 28 is slaved rearward by locking block 44 until the wind deflector sliding block 28 strikes a stop that is fixed with the roof. Sliding block pin 26 is pressed upward by main section 29 of sliding block track 27. In this way, pivoting lever 25 is pivoted around pivot axis 17. Wind deflector 16 is pivoted and locked in the pivoted position by the fact that, with stopped wind deflector sliding block 28, by continued movement of coupling element 36, a force is exerted on locking block 44, by a sloped surface 47 of the locking block receiving area 46 (FIG. 18), crosswise to sliding direction 14. This force presses the locking block 44 out of the receiving area 46 and into a locking block receiving area 48, now aligned with opening 45, of guide rail 22. In this way, the driving connection between the coupling element 36 and wind deflector sliding block 28 is released, and the wind deflector sliding block is fixed relative to guide rail 22. In doing so, sliding block pin 26 has reached forward horizontal end section 30 of sliding block track 27, so that forces acting on the wind deflector, e.g., wind forces, cannot transmit any force components in the sliding direction 14 on wind deflector sliding block 28.

Figure 19:
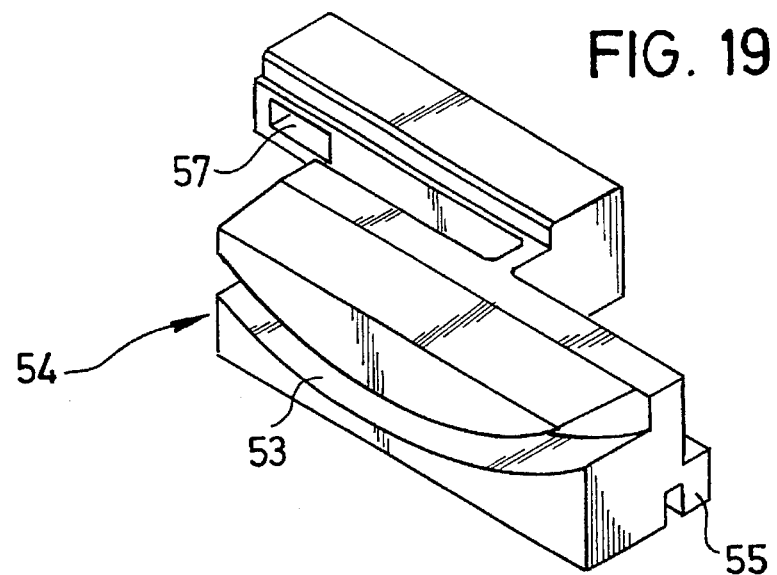
FIG. 19 is a perspective view of a forwardmost pivot beating.
Figure 20:
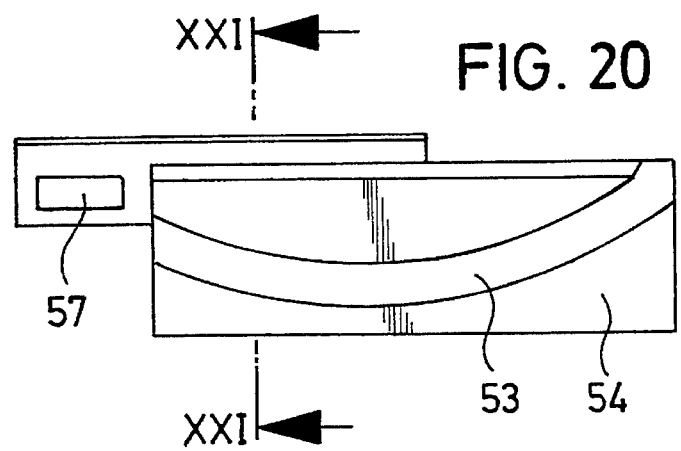
FIG. 20 is a side view of the forwardmost pivot beating of FIG. 19.
Figure 21:
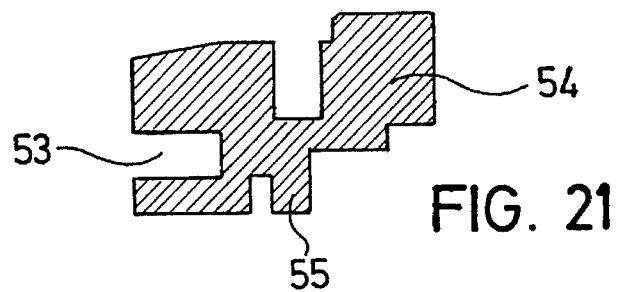
FIG. 21 is a sectional view taken along line XXI—XXI of FIG. 20.
Figure 22:
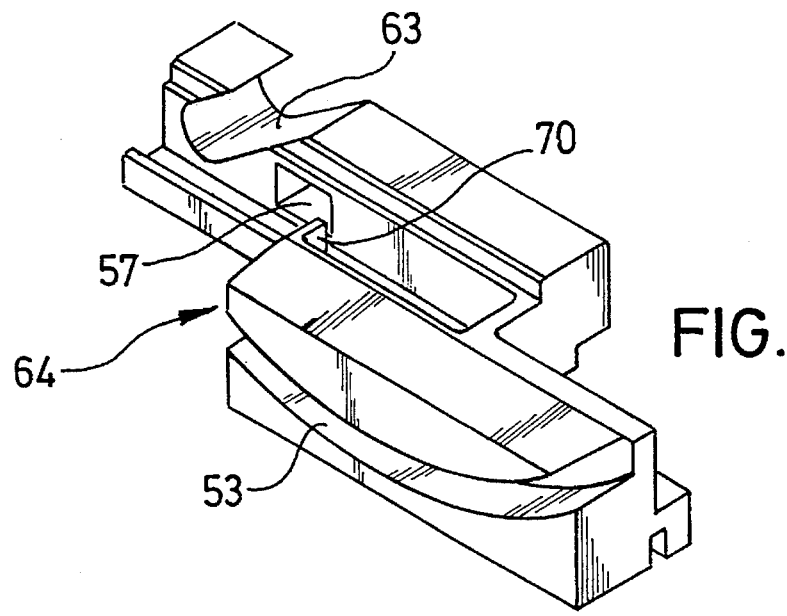
FIG. 22 is a perspective view of a pivot bearing for second and subsequent plates.
Figure 23:
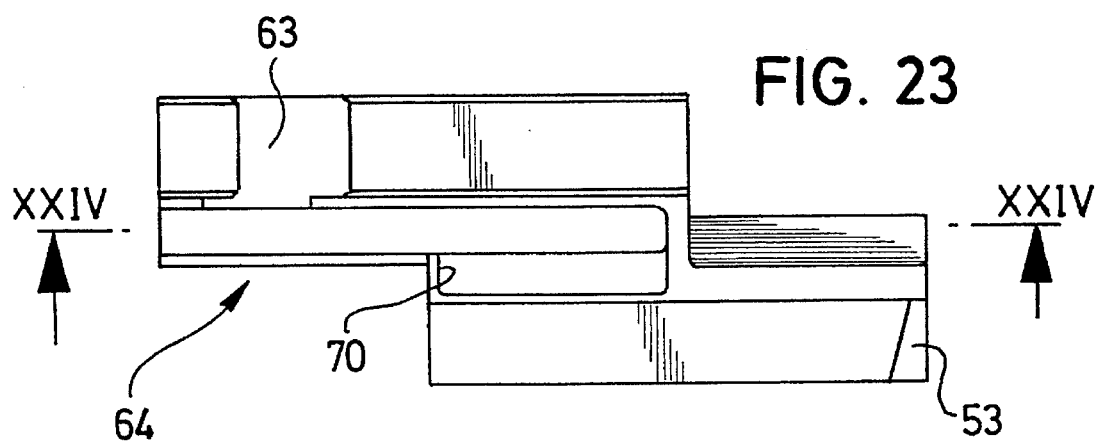
FIG. 23 is a top view of the pivot bearing of FIG. 22.
Figure 24:
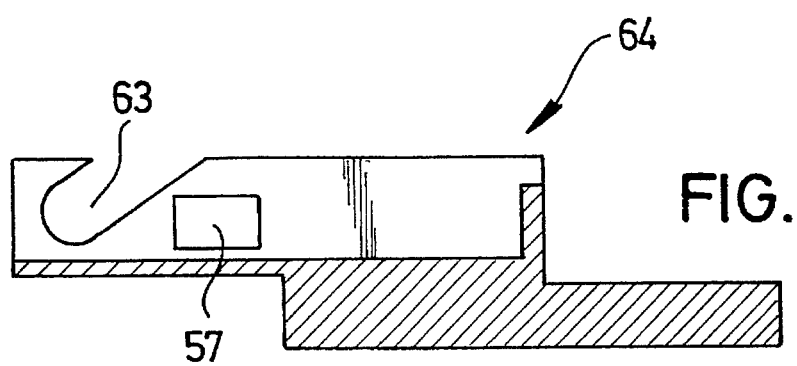
FIG. 24 is a sectional view through the pivot bearing along line XXIV—XXIV of FIG. 23.
Figure 43:
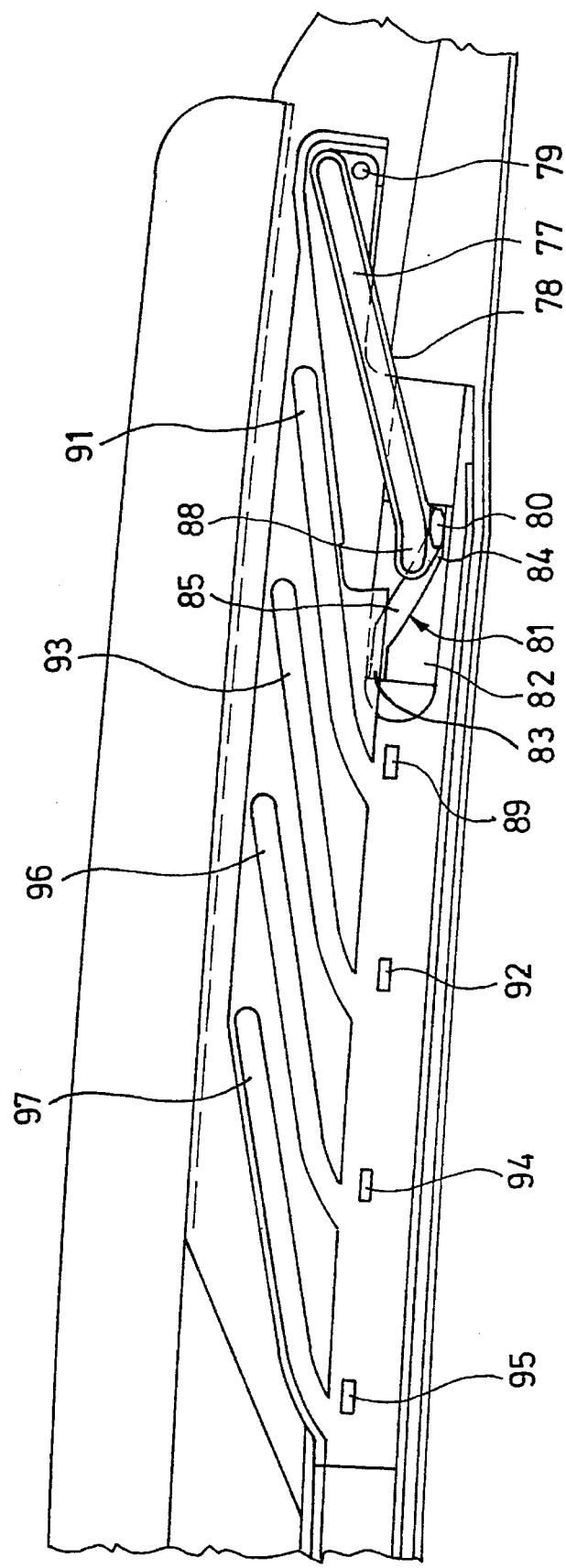
FIG. 43 is a side view of a laterally inner side of a roof fixture part containing the pivot tracks for the rear guide pins of the plates.
Figure 44:
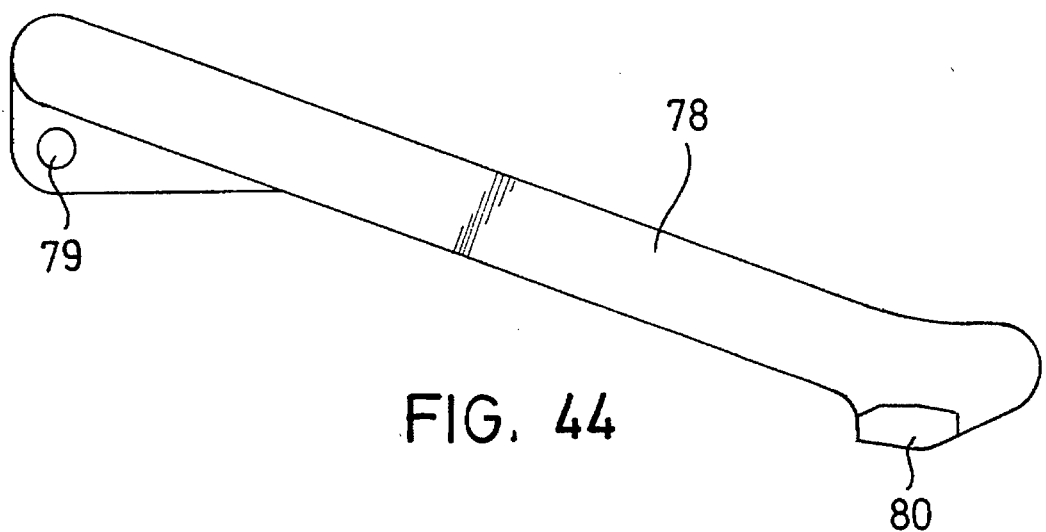
FIGS. 44 and 45 are side views of a hinged pivot guide device.
Figure 45:
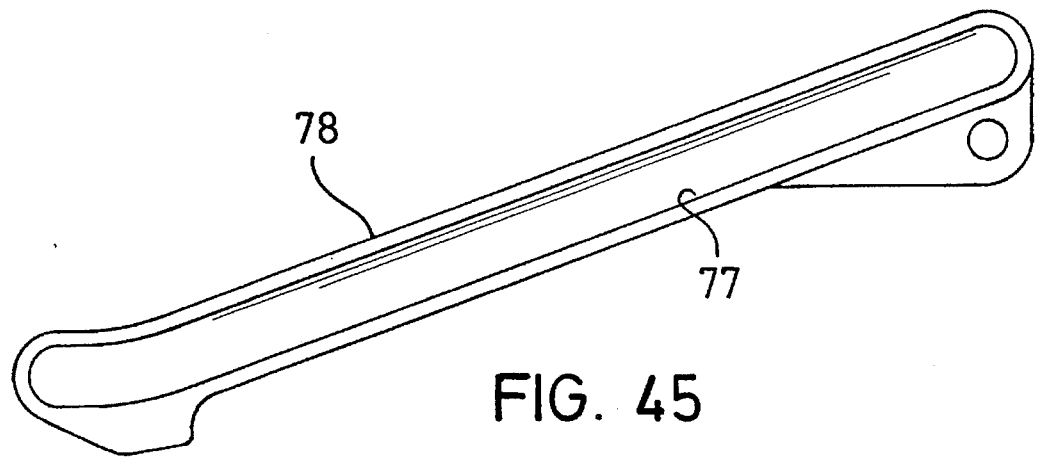
Figure 46:
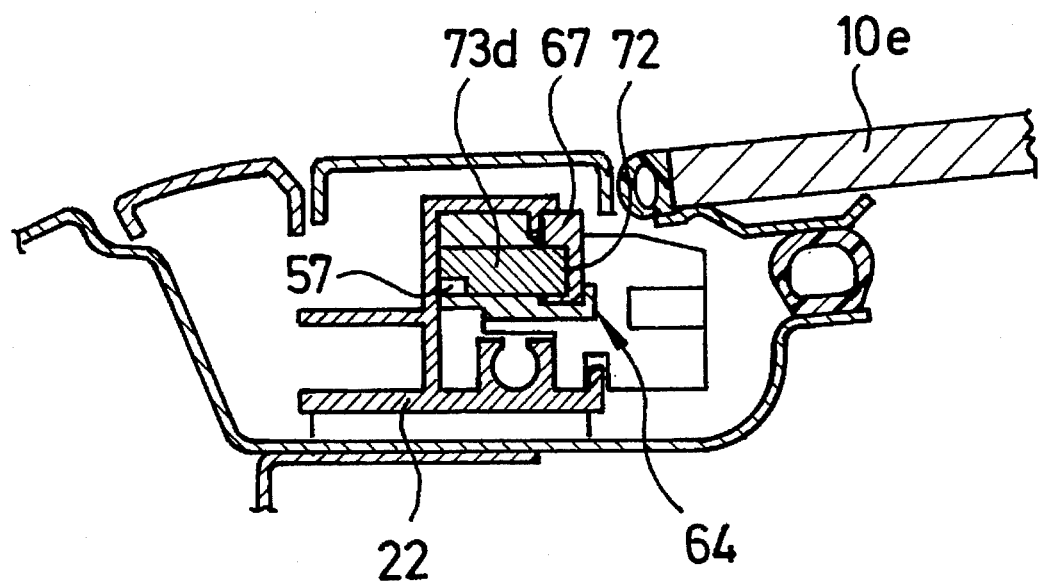

Sliding plates 10a to 10e are attached on each side of the roof opening 13 to a respective plate carrier 50 (FIGS. 41 to 43). A pivot beating segment 51 is attached on a forward part of plate carders 50 and a guide pin 52 is attached to a rear part thereof. The pivot bearing segment 51 and guide pin 52 form, for each sliding plate, a forward and a rear guide part. The pivot bearing segment 51 of the sliding plate 10e (which is the forwardmost sliding plate in the forward traveling direction of the vehicle 12) is constantly engaged with an arc-shaped guide groove 53 of a forwardmost pivot beating 54 (FIG. 19), which is guided to be slidable along guide rail 22, and thus, has a projection 55 which engages in guide track 37 of guide rail 22. Pivot bearing segment 51 and guide groove 53 define pivot axis 15e of sliding plate 10e.

This pivot axis also lies, like pivot axes 15a to 15d of the remaining sliding plates,-suitably at the height of fixed roof panel 11 or above it, to avoid, when pivoting the sliding plates, an undesired dipping of the front edges of the plates into roof opening 13.

Forwardmost pivot bearing 54 can be coupled to coupling element 36 to produce a driving connection with a drive unit 41. For this purpose, basically any shifting coupling can be provided that, suitably, depending on the position of coupling element 36 relative to guide rail 22, can be engaged and disengaged. In the embodiment illustrated, this involves a locking block coupling. For this purpose, forwardmost pivot bearing 54 has an opening 57 crosswise through it and in which a locking block 58 is supported to slide.

In the closed position of the plate system in which the plates 10a–10e are interconnected into a panel of plates, locking block 58 engages in a locking block receiving area 59 of guide rail 22, and it thus locks pivot bearing 54 with respect to vehicle roof 9. When coupling element 36, uncoupled in the above-explained way from wind deflector sliding block 28, is moved further rearward, a stop face 60 thereof strikes a stop face 61 of pivot bearing 54 (FIG. 8). A rearward-directed force from pivot bearing 54 is exerted on locking block 58 and presses the locking block 58 against a sloped face 61 of stationary locking block receiving area 59. This causes a crosswise force component to be transmitted to locking block 58, under whose influence locking block 58 leaves locking block receiving area 59 and is inserted instead into a locking block receiving area 62 of coupling element 36. In this way, pivot bearing 54 is released to slide along guide rail 22 and it is coupled by coupling element 36 to drive unit 41.

Figure 25:
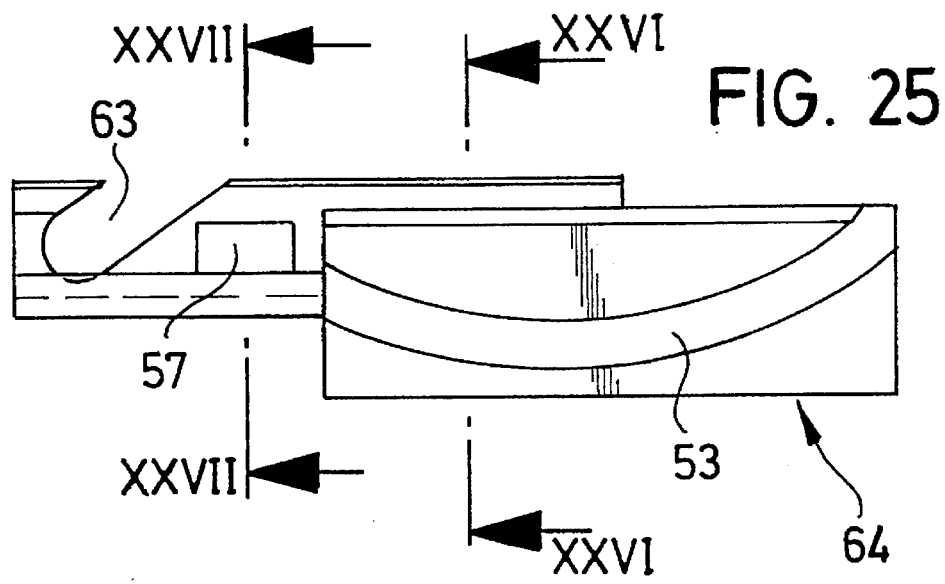
FIG. 25 is a side view of the pivot bearing of FIGS. 22 to 24.
Figure 26:
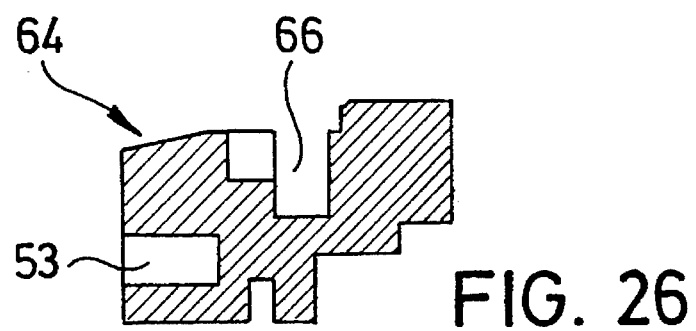
FIGS. 26 and 27 are sectional views through the pivot bearing along lines XXVI—XXVI and XXVII—XXVII in FIG. 25.
Figure 27:
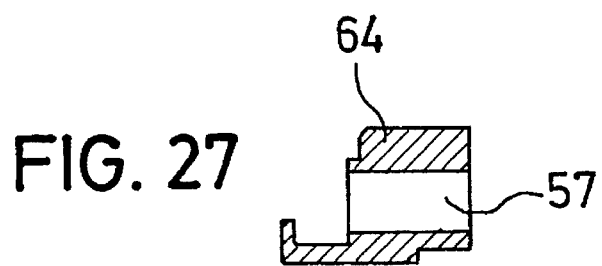
Figure 28:
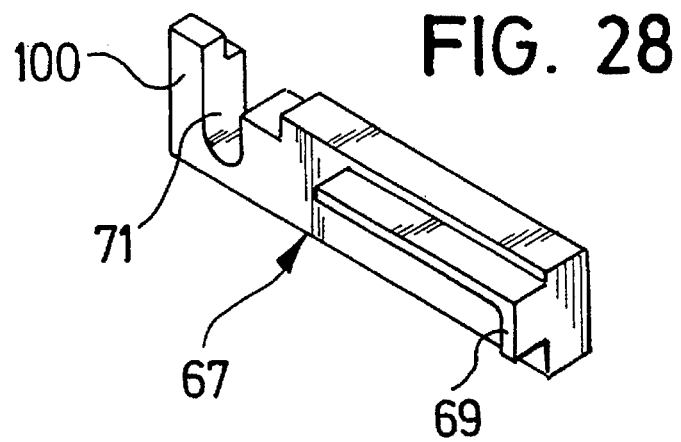
FIG. 28 is a perspective view of a blocking slide bar.
Figure 29:
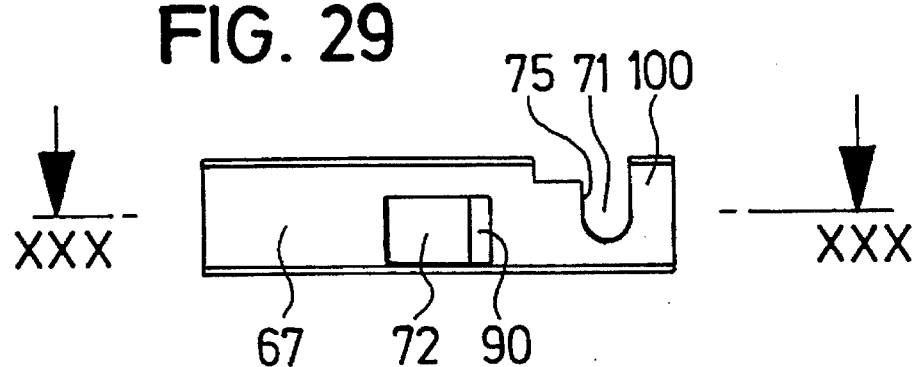
FIG. 29 is a side view of the blocking slide bar of FIG. 28.
Figure 30:
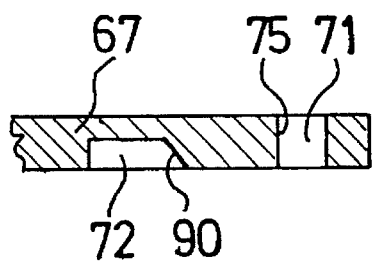
FIG. 30 is a partial sectional view of the blocking slide bar taken along line XXX—XXX in FIG. 29.
Figure 38:
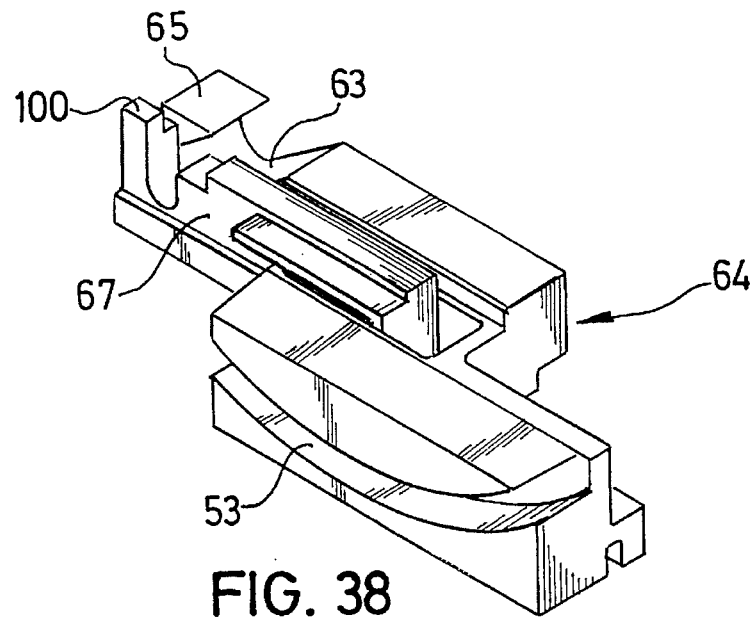
FIG. 38 is a perspective view of one of the bearing units.
Figure 39:
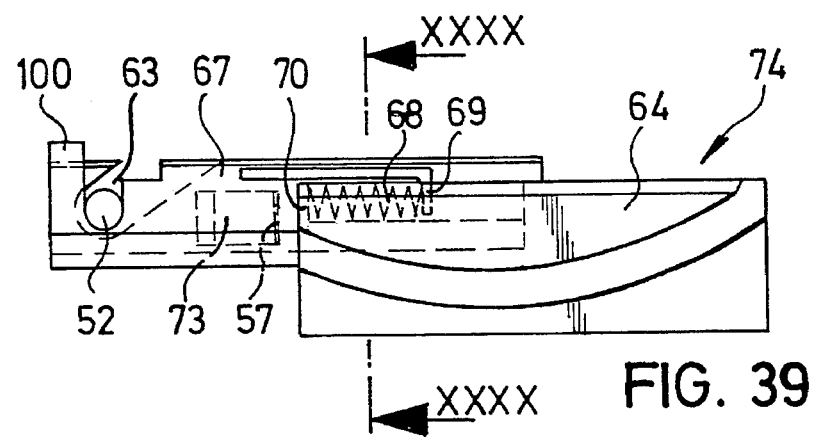
FIG. 39 is a side view of the bearing unit of FIG. 38.

Guide pin 52 of sliding plate 10e interacts with a groove 63 of a pivot bearing 64 and is sloped upward toward the rear and is open on top (FIGS. 25 & 38). Pivot bearing segment 51 of the next sliding plate 10d is supported on pivot bearing 64, which differs in the illustrated embodiment from the forwardmost pivot bearing 54, essentially, by a shoulder 65 that forms the groove 63. In particular, it also has an arc-shaped guide groove 53 and a crosswise opening 57. Further, a blocking slide bar 67 is supported to slide lengthwise a limited distance in a groove 66 of pivot bearing 64. A pressure spring 68 is located between a stop 69 on the rear end of blocking slide bar 67 and a stop 70 of pivot bearing 64, and it prestresses blocking slide bar 67 rearward with respect to pivot bearing 64 (FIG. 39). A groove 71 that extends in the vertical direction and that is open on top is made in the front part of blocking slide bar 67 (FIGS. 28–30). In an area of blocking slide bar 67 that is central in the lengthwise direction, there is a locking block receiving area 72 for a locking block 73 that is guided to be adjustable in crosswise opening 57 of pivot bearing 64. Pivot bearing 64, blocking slide bar 67, spring 68 and locking block 73 form a bearing unit designated overall by 74 that, except for the configuration of respective locking block 73, is made the same for each sliding plate 10d to 10a.

To differentiate the associated bearing unit and its components, e.g., in FIGS. 3 to 5, the bearing units are designated with 74a to 74d, and the individual parts of the gafing units have corresponding letters a to d appended. In the closed position of plate 10e, its guide pin 52 is located in groove 63 of pivot bearing 64d, as this can be seen from FIGS. 3a and 39. Blocking slide bar 67 prevents, with rear flank 75 of groove 71, guide pin 52 from sliding out of groove 63. Crosswise opening 57 and locking block receiving area 72 are aligned with one another (FIG. 39). Locking block 73d engaging in locking block receiving area 72 prevents a mutual shifting of the blocking slide bar 67 and pivot bearing 64d.

The preceding description applies for the interaction between pivot bearing segments 51 of sliding plates 10c to 10a and guide pins 52 of sliding plates 10d to 10b with pivot bearings 64c to 64a. Guide pin 52 of the rearmost sliding plate 10a engages in a pivot track 77 of a pivot guide device 78, which is pivoted on its rear end around a pivot axis that is fixed with the roof and is formed by a bearing pin 79 (FIG. 43).

Pivot guide device 78 carries, near its forward end, a cam 80 that, for its part, is engaged with a sliding block track 81 of a lifting sliding block 82. Sliding block track 81, essentially, has forward and rear end sections 83 or 84 and a main section 85 connecting these end sections and running sloped upward toward the front. Lifting sliding block 82 is guided to be movable along guide rail 22 and it is constantly connected, by a connecting rod 86 (FIGS. 4b & 14), to wind deflector sliding block 28. Connecting rod 86 is guided to be displaceable lengthwise in a guide track 87 of guide rail 22.

When the roof is closed and when wind deflector 16 is in the nonoperating position, lifting sliding block 82 assumes its forward end position. Cam 80 is located in rear end section 84 of the sliding block track 81 and is thus secured against unintended lifting. The forward end of pivot guide device 78 is pivoted downward. Guide pin 52 of rearmost sliding plate 10a is located in a forward end section 88 of sliding block slot 77, and end section 88, in this position of pivot guide device 78, runs essentially horizontal.

While wind deflector 16 is pivoted in the above-explained way, lifting sliding block 82 moves under the influence of connecting rod 86 along guide rail 22 rearward. In doing so, cam 88 reaches main section 85 of sliding block track 81, and it is raised by sliding block track 81 out of the position shown in FIG. 3b into the position shown in FIGS. 4b and 5b. Thus, pivot guide device 78, slaved by guide pin 52 located in the forward end of the pivot guide device, is pivoted clockwise around the bearing pin 79, as can be seen from a comparison of FIGS. 3b, 4b & 5b. As a result, the rearmost plate 10a is pivoted rearward sufficiently far for its rear edge to be lifted out from the rear edge of roof opening 13, above the fixed roof surface 11, as this can be seen in FIG. 4b. When coupling element 36 is then moved further rearward, it slaves forwardmost pivot bearing 54, and thus, also forwardmost sliding plate 10e.

Because of the engagement of guide pin 52 of sliding plate 10e in pivot bearing 64d and the securing of this engagement by associated blocking slide bar 67, the rearward-directed displacement force is transmitted to bearing unit 64d, which slides with sliding plate 10d. The same applies for each of the subsequent sliding plates, so that all of the plates 10e to 10a are moved rearward in the form of a panel of interconnected plates. Here, a frictional connection is present over the entire series of plates and bearing units up to guide pin 52 of the rearmost plate 10a, which leaves forward end section 88 of sliding block slot 77 and runs rearward in the upward-sloped pivot track 77 of pivot guide device 78.

Because of the upward shifting of guide pin 52, plate 10a is pivoted counterclockwise around pivot axis 15a (in FIGS. 3b and 4b), which is defined by pivot bearing segment 51 and guide groove 53 of bearing unit 74. A sliding movement of the plates rearward is superimposed on this pivoting movement. When plate 10*a* is completely pivoted this way and pushed back, bearing unit 74*a* has reached a position relative to guide rail 22 in which the crosswise opening 57 of pivot bearing 64*a* is aligned with a locking block receiving area 89 that is fixed with the roof and that can be made, in particular, in guide rail 22 or in roof frame 20. Because of the transverse force exerted by guide pin 52 of plate 10*b* on flank 75 of blocking slide bar 67 of the bearing unit 64a and directed rearward, a crosswise-directed force component is exerted on locking block 73*a* by a sloped face 90 of blocking slide bar locking block receiving area 72. Thus, locking block 73*a* leaves locking block receiving area 72 of blocking slide bar 67 and engages instead in the locking block receiving area 89 that is fixed with the roof. Blocking slide bar 67 is now released for a movement directed rearward with respect to pivot bearing 64*a*, while pivot bearing 64*a* is locked with respect to guide rail 22 and roof frame 20. The locking of guide pin 52 of plate 10*b* in groove 63 of pivot bearing 64*a* is released. During the course of the continued sliding of plate 10*b*, its guide pin 52 exits the top of pivot bearing groove 63, and the guide pin 52 reaches a pivot track 91 that is fixed to the roof and rises with a rearward slope. Plate 10*b* is released from the panel of plates and, with further rearward shifting of coupling element 36, is pivoted into a position essentially parallel to previously pivoted plate 10*a*, and again, a pivoting movement and a sliding movement are superimposed on one another. When plate 10*b* reaches its completely pivoted position, then, crosswise opening 57 of pivot bearing 64*b* is aligned with a locking block receiving area 92 that is fixed with the roof.

In the way explained above for bearing unit 74*a*, locking block 73*b* of bearing unit 74*b* releases the associated blocking slide bar 67, and by inserting the locking block 73*b* into a fixed locking block receiving area 92, bearing unit 74*b* is fixed relative to the roof frame 20 and guide rail 22. The guide pin 52 of the plate 10*c* is released to transfer into a pivot track 93 fixed to the roof, and plate 10*c* is pivoted while being pushed back. The same is repeated for plates 10*d* and 10*e*.

The associated fixed locking block receiving areas for plates 10*d* and 10*e* (corresponding to 89 and 92) are designated 94 and 95, and the associated pivot tracks (corresponding to 91 and 93) are designated 96 and 97 (FIG. 43). When the guide pin 52 of sliding plate 10*e* has reached the end of pivot track 97, as shown FIG. 5*b*, the roof is fully opened. Bearing units 74*a* to 74*d* are fixed with respect to the roof frame 20 by locking blocks 73*a* to 73*d*. A similar fixing of the forwardmost pivot bearing 54 to roof frame 20 is not necessary because this pivot bearing remains connected by coupling element 36 to the drive unit 41. Pivot tracks 91, 93, 96 and 97 can be made in roof fixture parts 98, which extend on both sides of roof opening 13. Roof fixture parts 98 can be part of a roof rail or the like, similar to the side rails of a vehicle roof luggage rack.

In the closing procedure of the roof illustrated, the locking block 73*a* that is intended to engage in the fixed locking block receiving area 89, first passes by locking block receiving areas 95, 94 and 92. Similarly, locking block 73*b*, before engaging in locking block receiving area 92, also passes by the locking block receiving areas 95 and 94, while the locking block 73*c* passes by locking block receiving area 95 before it reaches the locking block receiving area 94. To prevent an undesired engagement of locking block 73*a*, 73*b* and 73*c* in the fixed locking block receiving areas which they are supposed to bypass before reaching the appropriate locking block receiving area and being inserted therein, the projections 99*a*, 99*b*, 99*c* of locking blocks 73*a*, 73*b* or 73*c* are offset differently with respect to the remainder of these locking blocks, as this is apparent especially from FIGS. 31 to 37. Correspondingly, locking block receiving areas 89, 92 and 94 are located at different heights with respect to guide rail 22 as seen in FIG. 43. Consequently each of the locking blocks can engage only with the fixed locking block receiving area intended for it.

The closing movement of the roof proceeds in the reverse sequence compared to the opening movement. Starting from the fully opened state (FIG. 5*b*), the coupling element 36 which is permanently connected to drive unit 41 is slaved forward, by locking block 58, first forward pivot bearing 54. Guide pin 52 of sliding plate 10*e* runs forward and downward in fixed pivot track 97. Plate 10 is pivoted clockwise (in FIG. 5*b*) around the pivot axis 15*e* defined by pivot bearing segment 51 and guide groove 53 of pivot bearing 54, while it simultaneously performs a forward sliding movement. In doing so, guide pin 52 is placed behind an upward-projecting projection 100 on the forward end of blocking slide bar 67 of the bearing unit 64*d* (FIGS. 28, 29 and 38, 39) which, at this point, is still coupled by locking block 73*d* to guide rail 22. By continued further movement of coupling element 36, guide pin 52 pulls blocking slide bar 67 forward by projection 100. Spring 68 is compressed and a forward-directed sliding force is transmitted to pivot bearing 64*d* and, from it, to the slidable locking block 73*d*. Locking block 73*d* is consequently pressed against a sloped face of the fixed locking block receiving area 95, a sloped face that is complementary to its sloped face 101 (FIG. 33). A crosswise force component is, thus, exerted on locking block 73*d*, which presses locking block 73*d* out of locking block receiving area 95 and lets it engage in locking block receiving area 72 of the blocking slide bar 67, which is now aligned with the crosswise opening 57.

Pivot bearing 64d and associated blocking slide bar 67 are thus, now, in the position according to FIGS. 38 and 39, coupled with one another, in which guide pin 52 of sliding plate 10*e* is locked in pivot bearing groove 63, and consequently, plate 10*e* is pivoted back into the roof plane. Corresponding courses of movement are repeated, one after another, for the remaining sliding plates 10*d* to 10*a* and bearing units 74*c* to 74*a*, until finally the panel formed by interconnected plates 10*e* to 10*b* assumes its closed position, and guide pin 52 of sliding plate 10*a* has reached the forward end of the end section 88 of the sliding block slot 77 of pivotable pivot guide device 78.

After pivot bearing 54 has reached its forward end position, which is determined, for example, by a stop on guide rail 22, a crosswise force is exerted on locking block 58 by continued sliding of the coupling element 36 forward. This crosswise force results from a sloped face 102 of locking block receiving area 62 made in coupling element 36, which causes locking block 58 to leave locking block receiving area 62 and be inserted into the fixed locking block receiving area 59. Thus, the coupling between the plate system and drive unit 41 is broken, and the panel formed of the interconnected plates is fixed with respect to the guide rail 22.

Coupling element 36, which continues to go forward, comes to lie with a stop face 103 against a stop face 104 of wind deflector sliding block 28. Thus, locking block 44, supported in opening 45 of wind deflector sliding block 28, is pressed against a sloped face 105 of the fixed locking block receiving area 48. Locking block 44 leaves locking block receiving area 48, and is inserted into locking block receiving area 46 of coupling element 36. In the course of the forward movement Of wind deflector sliding block 28, now taking place, sliding block track 27 presses sliding block pin 26 downward. Pivoting lever 25 is pivoted clockwise from the position shown in FIG. 15, lowering wind deflector 16 into its rest position. Simultaneously, by connecting rod 86, lifting sliding block 82 is moved forward. Cam 80 of pivot guide device 78 is pressed downward by sliding block track 81 of lifting sliding block 82. Pivot guide device 78, correspondingly, pulls guide pin 52 of plate 10a downward. Plate 10a is brought into its lowered closed position. Now vehicle roof 9 is completely closed.

While a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Vehicle roof with a series of plates for selectively closing and at least partially opening a roof opening in a fixed roof surface, the plates, in a closed position, bordering one another and forming a continuous panel of plates, each plate being slidably guided along a path of movement in a guide device that is connected with the fixed roof surface, on each lateral side of the roof opening, on a pair of guide elements which are spaced one forward of the other in a sliding direction, so that, when the plates are displaced along the guide device in an opening direction, the plates of the continuous panel of plates perform a translational movement during which the panel of plates is separated into individual plates in a plate-by-plate manner commencing with a rearmost plate of the plate system, the panel of plates being reestablished in a plate-by-plate manner commencing with a forwardmost plate when the plates are displaced along the guide device in a closing direction; wherein slidable beating units are provided as a means for supporting the plates for sliding movement along a common guide track with a respective rear guide of one of the plates and a forward guide of a rearwardly next plate in the series of plates connected thereto, interlocking pairs of said slidable beating units together by a respective one of the plates until separation thereof; and wherein each of said bearing units is provided with a respective blocking device that is responsive to sliding movement of the panel of plates bringing the respective bearing unit to a predetermined position with respect to the guide track, each blocking device releasing the rear guide of the respective plate from the respective bearing unit, when the roof is opened, for enabling a pivoting movement the respective plate, and when closing the roof, interlocking the rear guide of the respective plate with the respective bearing unit.

2. Vehicle roof according to claim 1, wherein each of the bearing units is provided with a respective pivot bearing in which a respective plate is pivoted at its forward guide, and a receiving area for detachably receiving the rear guide of the forwardly next plate of the series of plates; and wherein said blocking device has a blocking element which is displaceable relative to the pivot bearing for locking the respective rear guide in the receiving area and for releasing the plate for a pivoting movement.

3. Vehicle roof according to claim 2, wherein each of said beating units is provided with a locking device which locks the pivot beating and blocking element, when the roof is closed and when sliding the panel of plates, in a position in which the rear guide is held in place.

4. Vehicle roof according to claim 3, wherein each locking device has means for locking the pivot bearing with respect to a fixed part of the roof when the respective bearing unit reaches a position in which each said plate, whose forward guide point is supported in the bearing unit, is completely. pivoted.

5. Vehicle roof according to claim 4, wherein each locking device comprises a changeover coupling that fixes the pivot bearing with respect to one of the blocking element and the fixed part of the roof, depending on the position of respective bearing unit.

6. Vehicle roof according to claim 5, wherein the changeover coupling comprises a locking block coupling.

7. Vehicle roof according to claim 1, wherein a pivot track is provided for each plate as a means for guiding the respective rear guide when it is released for pivoting movement.

8. Vehicle roof according to claim 7, wherein the pivot track for the rearmost one of the plates is part of a pivotable pivot guide device by which the rear edge of the rearmost plate, when opening the roof, is lifted above a rear edge of the roof opening before sliding the panel of plates.

9. Vehicle roof according to claim 8, wherein pivot tracks for the plates other than said rearmost one are fixed with relative to the fixed surface roof.

10. Vehicle roof according to claim 1, wherein the forward guide of the forwardmost one of the plates is supported in a pivot bearing that is slidable along the guide device and is connected to a drive unit of the roof.

11. Vehicle roof according to claim 10, wherein the connection of the pivot bearing supporting the forwardmost plate to the drive unit is produced by a detachable coupling of the pivot beating with a coupling element that is displaceable along the guide device and is permanently connected to the drive unit.

12. Vehicle roof according to claim 11, further comprising a wind deflector and a displacement device for operation thereof; wherein the coupling element forms a means for automatically coupling with the pivot bearing of the forwardmost plate along one portion of the guide device and with the displacement device for the wind deflector along another portion of the guide device.

13. Vehicle roof according to claim 12, wherein the means for automatically coupling comprises a first changeover coupling that couples, in a first position, the pivot beating of the forwardmost plate with the coupling element and, in a second position, the pivot beating with a fixed part of the roof, and a second changeover coupling that, in a first position, couples the wind deflector displacement device with said coupling element and, in a second position, the wind deflector adjustment device with a part integral with the roof.

14. Vehicle roof according to claim 13, wherein both of said changeover couplings are locking block couplings.

15. Vehicle roof according to claim 13, wherein a pivot track is provided for each plate as a means for guiding the respective rear guide when it is released for pivoting movement; wherein the pivot track for the rearmost one of the plates is part of a pivotable pivot guide device by which the rear edge of the rearmost plate, when opening the roof, is lifted above a rear edge of the roof opening before sliding the panel of plates; and wherein a lifting device is couplable to the drive unit for pivoting of the pivotable pivot guide device.

16. Vehicle roof according to claim 15, wherein means for permanently connecting the wind deflector displacement device and the lifting device of the pivotable pivot guide device to each other is provided.

* * * * *